(12) United States Patent
Sanchez Valente et al.

(10) Patent No.: US 8,211,395 B2
(45) Date of Patent: Jul. 3, 2012

(54) OBTAINING MULTIMETALLIC OXIDES DERIVED FROM HYDROTALCITE TYPE COMPOUNDS

(75) Inventors: Jaime Sanchez Valente, Mexico City (MX); Esteban Lopez Salinas, Mexico City (MX); Manuel Sanchez Cantu, Mexico City (MX); Francisco Hernandez Beltran, Mexico City (MX)

(73) Assignee: Instituto Mexicano Del Petroleo, Mexico City (MX)

( * ) Notice: Subject to any disclaimer, the term of this patent is extended or adjusted under 35 U.S.C. 154(b) by 0 days.

(21) Appl. No.: 13/106,015

(22) Filed: May 12, 2011

(65) Prior Publication Data

US 2011/0212009 A1 Sep. 1, 2011

Related U.S. Application Data

(60) Division of application No. 11/326,608, filed on Jan. 6, 2006, now Pat. No. 7,964,175, which is a continuation-in-part of application No. PCT/MX03/00051, filed on Jul. 7, 2003.

(51) Int. Cl.
*B01D 53/50* (2006.01)
*B01J 21/00* (2006.01)
*B01J 23/00* (2006.01)

(52) U.S. Cl. ........... 423/244.06; 423/244.09; 423/244.1; 502/300; 502/305; 502/324; 502/325; 502/340; 502/344

(58) Field of Classification Search ............. 423/244.06, 423/244.09, 244.1; 502/300, 305, 324, 325, 502/340, 344
See application file for complete search history.

(56) References Cited

U.S. PATENT DOCUMENTS

| | | | |
|---|---|---|---|
| 3,796,792 A | 3/1974 | Miyata et al. | |
| 3,879,525 A | 4/1975 | Miyata et al. | |
| 4,728,635 A | 3/1988 | Bhattacharyya et al. | |
| 4,790,982 A | 12/1988 | Yoo et al. | |
| 5,358,701 A | * 10/1994 | Pinnavaia et al. ......... | 423/242.1 |
| 5,399,329 A | 3/1995 | Schutz et al. | |
| 5,591,418 A | * 1/1997 | Bhattacharyya et al. .. | 423/239.1 |
| 5,750,020 A | 5/1998 | Bhattacharyya et al. | |
| 5,785,938 A | 7/1998 | Pinnavaia et al. | |
| 5,928,496 A | 7/1999 | Albers et al. | |
| 6,028,023 A | 2/2000 | Vierheilig | |
| 6,171,991 B1 | 1/2001 | Stamires et al. | |
| 6,387,033 B1 | 5/2002 | Choudary et al. | |
| 6,514,473 B2 | 2/2003 | Noweck et al. | |

(Continued)

OTHER PUBLICATIONS

Sanchez Cantu, Bachelor's Degree Thesis IMP, "*Sintesis de Compuestos del Tipo Hidrotalcita y sus Aplicaciones como Reductores de Azufre en el Proceso FCC*". (See p. 2 of IDS.), Apr. 2002.

(Continued)

*Primary Examiner* — Timothy Vanoy
(74) *Attorney, Agent, or Firm* — Roylance, Abrams, Berdo & Goodman, L.L.P.

(57) ABSTRACT

A procedure for obtaining mixed multimetallic oxides derived from hydrotalcite type compounds, characterized in that the laminar metallic hydroxides obtained are constituted by three or four metallic cations, forming part of the sheets of the hydrotalcite type material represented by the formula:

$$[M(II)_{1-x-y-z}M(II)'_xM(III)_yM(III)'_z(OH)_2](A^{n-}{}_{y+z/n}) \cdot m H_2O.$$

by a process comprising: (1) preparing an aqueous or organic solution containing three or more cations; (2) preparing an alkaline solution; (3) slowly combining solutions (1) and (2) to cause the co-precipitation of the cations in the form of hydroxides; (4) washing the precipitate containing the hydrotalcites with water, until removal of the non-precipitated ions; (5) drying; and (6) calcining the hydrotalcites.

25 Claims, 10 Drawing Sheets

X-ray diffraction patterns of the hydrotalcite-like materials:
a) [Mg$_{0.651}$Fe$_{0.063}$Al$_{0.286}$(OH)$_2$](CO$_3$)$_{0.174}$·0.821 H$_2$O
b) [Mg$_{0.714}$Fe$_{0.107}$Al$_{0.179}$(OH)$_2$](CO$_3$)$_{0.143}$·0.828 H$_2$O
c) [Mg$_{0.704}$Fe$_{0.192}$Al$_{0.104}$(OH)$_2$](CO$_3$)$_{0.148}$·0.920 H$_2$O
d) [Mg$_{0.688}$Fe$_{0.311}$(OH)$_2$](CO$_3$)$_{0.160}$·0.800 H$_2$O

U.S. PATENT DOCUMENTS

| | | |
|---|---|---|
| 6,517,795 B1 | 2/2003 | Noweck et al. |
| 6,652,828 B2 | 11/2003 | Stamires et al. |
| 7,964,175 B2 * | 6/2011 | Sanchez Valente et al. .. 423/600 |

OTHER PUBLICATIONS

Sanchez Valente, Doctoral Thesis, "*Synthèse et Characterisation de solides basiques de type hydrotalcite et leurs applications en catalyse*" IRC, Francia, prior to Jul. 7, 2002.

Figueras et al., Isophorone Isomerization as Model Reaction for the Characterization of Solid Bases: Application to the Determination of the number of Sites, Journal of Catalysis 211, 2002, pp. 144-149.

Sanchez et al., Basic Properties of the Mixed Oxides Obtained by Thermal Decomposition of Hydrotalcites Containing Different Metallic Compositions, Journal of Catalysis 189, 2000, pp. 370-381.

Kumbhar et al., Mg-Fe Hydrotalcite as a Catalyst for the Reduction of Aromatic Nitro Compounds with Hydrazine Hydrate, Journal of Catalysis 191, 2000, pp. 467-473.

Sanchez et al., Mossbauer Spectroscopic Study of Iron Containing Hydrotalcite Catalysts for the Reduction of Aromatic Nitro Compounds, Hyperfine Interactions, 131 (1-4): 2000, 43-50.

Lopez et al., Hydrogen Transfer Reduction of 4-tert-Butylcyclohexanone and Aldol Condensation of Benzaldehyde with Acetophenone on Basic Solids, Journal of Catalysis 208, 2002, pp. 30-37.

Rao, Activation of Mg-Al Hydrotalcite Catalysts for Aldol Condensation Reactions, Journal of Catalysis 173, 1998, pp. 115-121.

Kumbhar et al., Meerwein-Ponndorf-Verley reduction of carbonyl compounds catalysed by Mg-Al hydrotalcite, Chem. Commun., No. 5, vol. 7, 1998, pp. 535-536.

Kumbhar et al., Modified Mg-Al hydrotalcite: a highly active heterogeneous base catalyst for cyanoethylation of alcohols, No. 10, 1998, pp. 1091-1092.

Kocaefe et al., Comparison of the Sulfation Rates of Calcium, Magnesium and Zinc Oxides with $SO_2$ and $SO_3$, The Canadian Journal of Chemical Engineering, vol. 63, Dec. 1985, pp. 971-977.

Pausch et al., Syntheses of Disordered and Al-Rich Hydrotalcite-Like Compounds, Clays and Clay Minerals, vol. 34, No. 5, 1986, pp. 507-510.

Miyata, Physico-Chemical Properties of Synthetic Hydrotalcites in Relation to Composition, Clays and Clay Minerals, vol. 28, No. 1, 1980, pp. 50-56.

* cited by examiner

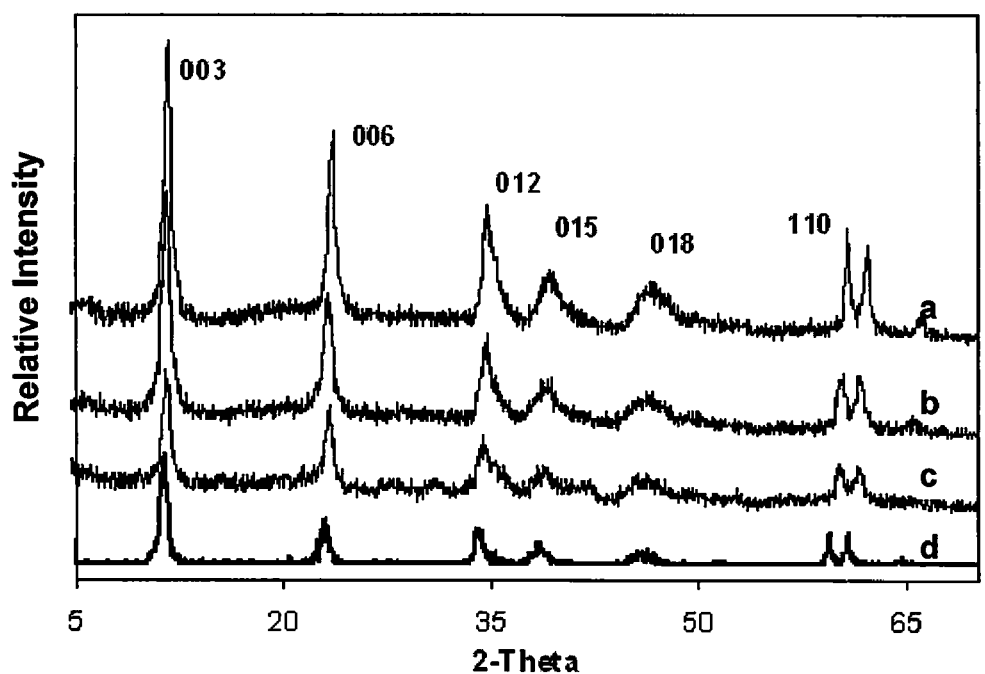
Figure 1. X-ray diffraction patterns of the hydrotalcite-like materials:
a) $[Mg_{0.651}Fe_{0.063}Al_{0.286}(OH)_2](CO_3)_{0.174} \cdot 0.821\ H_2O$
b) $[Mg_{0.714}Fe_{0.107}Al_{0.179}(OH)_2](CO_3)_{0.143} \cdot 0.828\ H_2O$
c) $[Mg_{0.704}Fe_{0.192}Al_{0.104}(OH)_2](CO_3)_{0.148} \cdot 0.920\ H_2O$
d) $[Mg_{0.688}Fe_{0.311}(OH)_2](CO_3)_{0.160} \cdot 0.800\ H_2O$

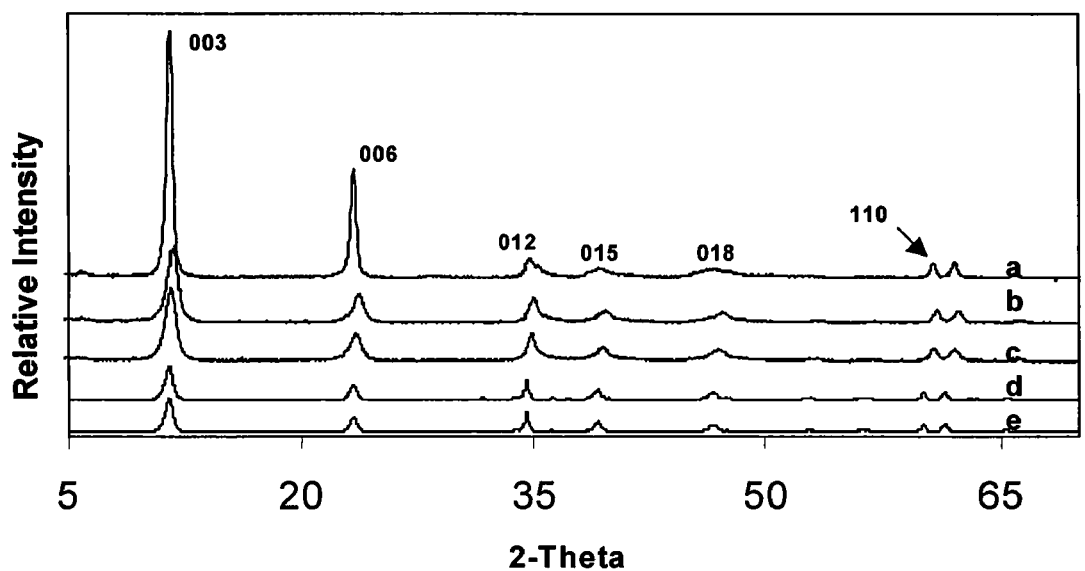
Figure 2. X-ray diffraction patterns of the hydrotalcite-like materials:
a) $[Mg_{0.478}Zn_{0.232}Al_{0.290}(OH)_2]$ $(CO_3)_{0.145} \cdot 0.857\ H_2O$
b) $[Mg_{0.487}Zn_{0.201}Al_{0.312}(OH)_2]$ $(CO_3)_{0.156} \cdot 0.902\ H_2O$
c) $[Mg_{0.493}Zn_{0.165}Al_{0.342}(OH)_2]$ $(CO_3)_{0.171} \cdot 0.978\ H_2O$
d) $[Zn_{0.75}Al_{0.25}(OH)_2]$ $(CO_3)_{0.125} \cdot 0.840\ H_2O$
e) $[Mg_{0.744}Al_{0.256}(OH)_2]$ $(CO_3)_{0.128} \cdot 0.850\ H_2O$.

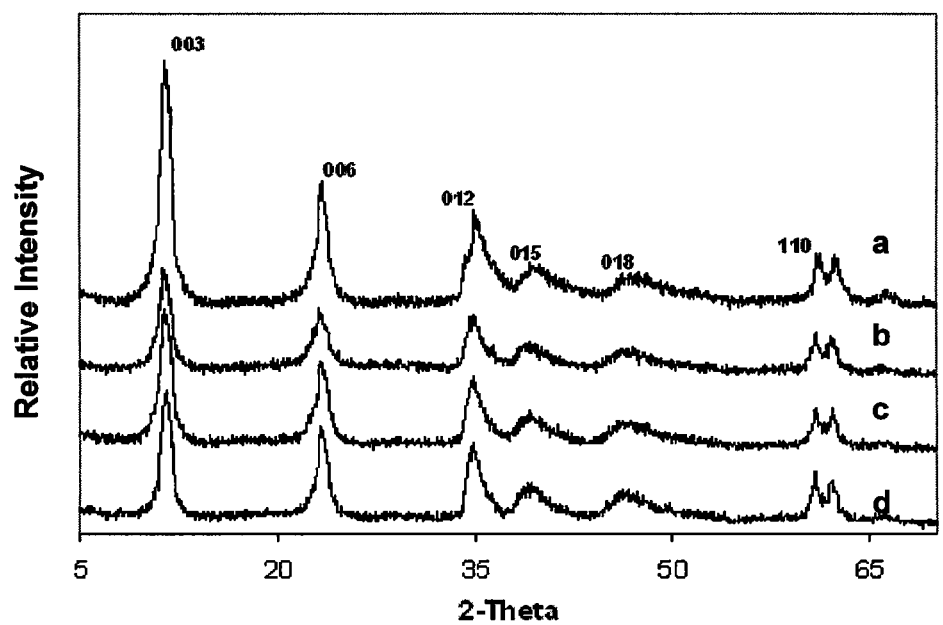
Figure 3. X-ray diffraction patterns of the hydrotalcite-like materials:
a) $[Ni_{0.833}Al_{0.167}(OH)_2](CO_3)_{0.084} \cdot 0.683\ H_2O$.
b) $[Mg_{0.457}Ni_{0.292}Al_{0.251}(OH)_2](CO_3)_{0.126} \cdot 0.849\ H_2O$
c) $[Mg_{0.483}Ni_{0.222}Al_{0.295}(OH)_2](CO_3)_{0.147} \cdot 0.876\ H_2O$
d) $[Mg_{0.589}Ni_{0.111}Al_{0.300}(OH)_2](CO_3)_{0.150} \cdot 0.885\ H_2O$

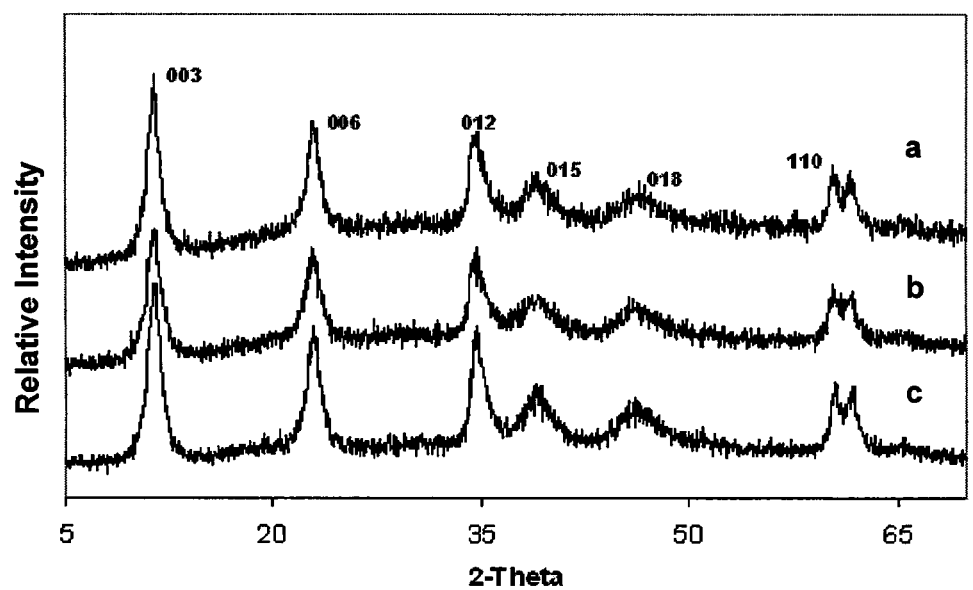
Figure 4. X-ray diffraction patterns of the hydrotalcite-like materials:
a) $[Mg_{0.600}Cu_{0.148}Al_{0.252}(OH)_2](CO_3)_{0.126} \cdot 0.709\ H_2O$
b) $[Mg_{0.658}Cu_{0.098}Al_{0.244}(OH)_2](CO_3)_{0.122} \cdot 0.687\ H_2O$
c) $[Mg_{0.307}Cu_{0.118}Al_{0.578}(OH)_2](CO_3)_{0.289} \cdot 0.803\ H_2O$

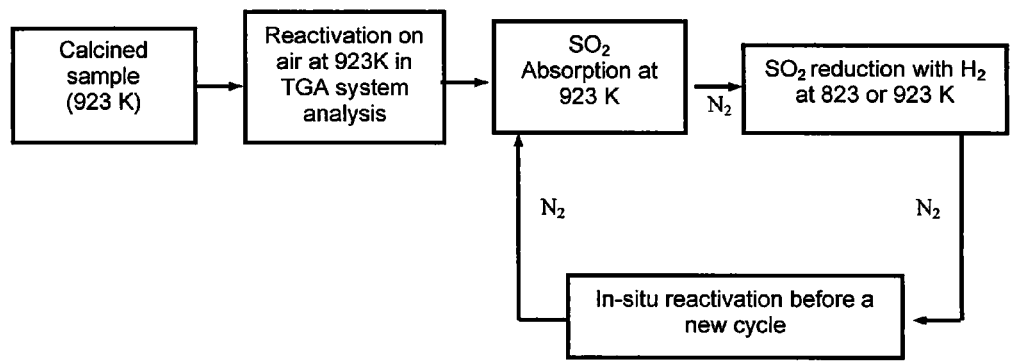
Figure 5. Evaluation scheme of $SO_2$ absorption-reduction test on multimetallic calcined hydrotalcite-like compounds.

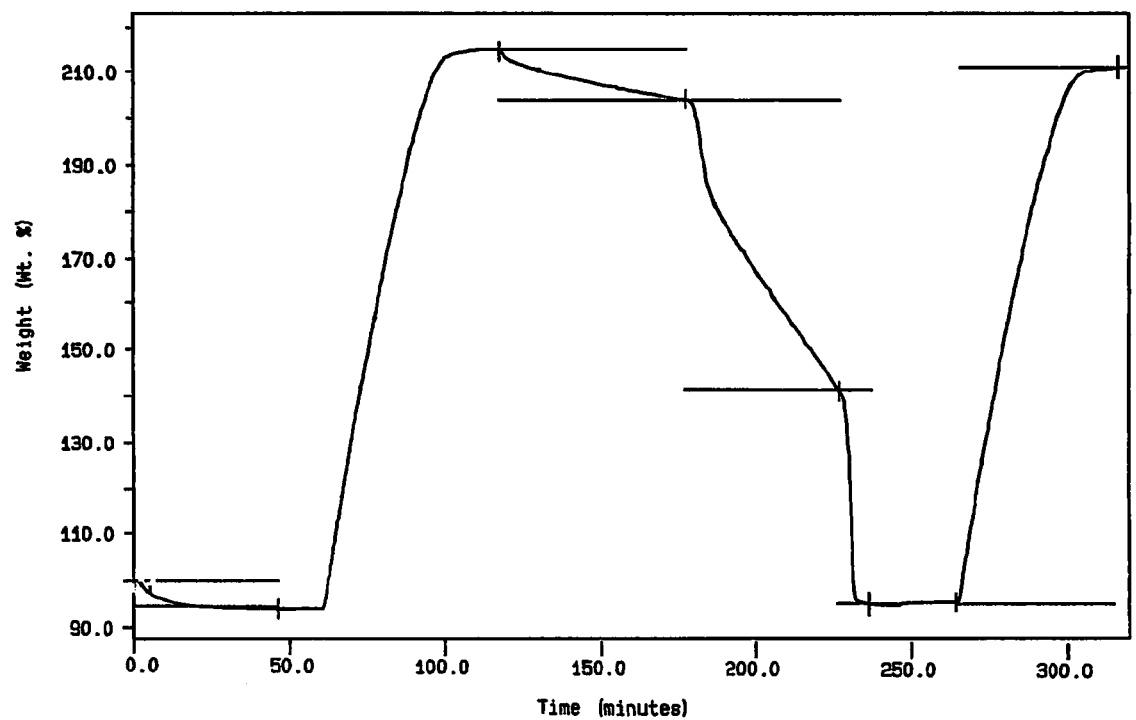
Figure 6. TGA-SO$_2$ Absorption on calcined:
[Mg$_{0.744}$Al$_{0.256}$(OH)$_2$](CO$_3$)$_{0.128}$·0.850H$_2$O

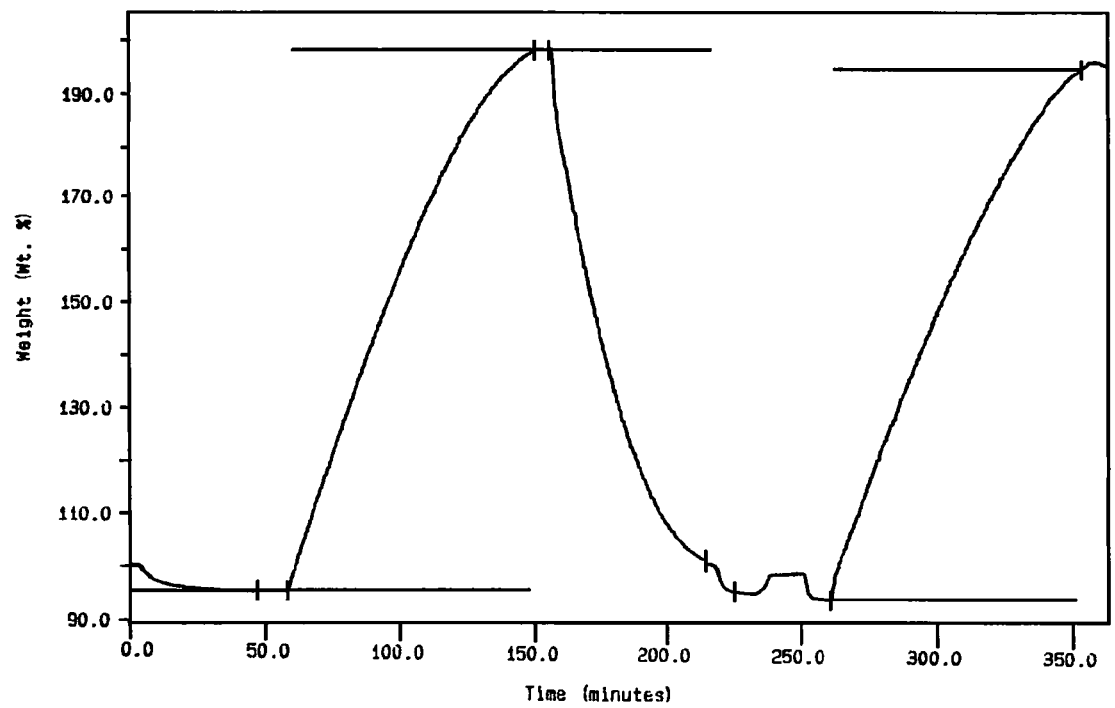
Figure 7. TGA-SO$_2$ Absorption on calcined:
[Mg$_{0.651}$ Fe$_{0.063}$ Al$_{0.286}$(OH)$_2$] (CO$_3$)$_{0.174}$ · 0.821 H$_2$O

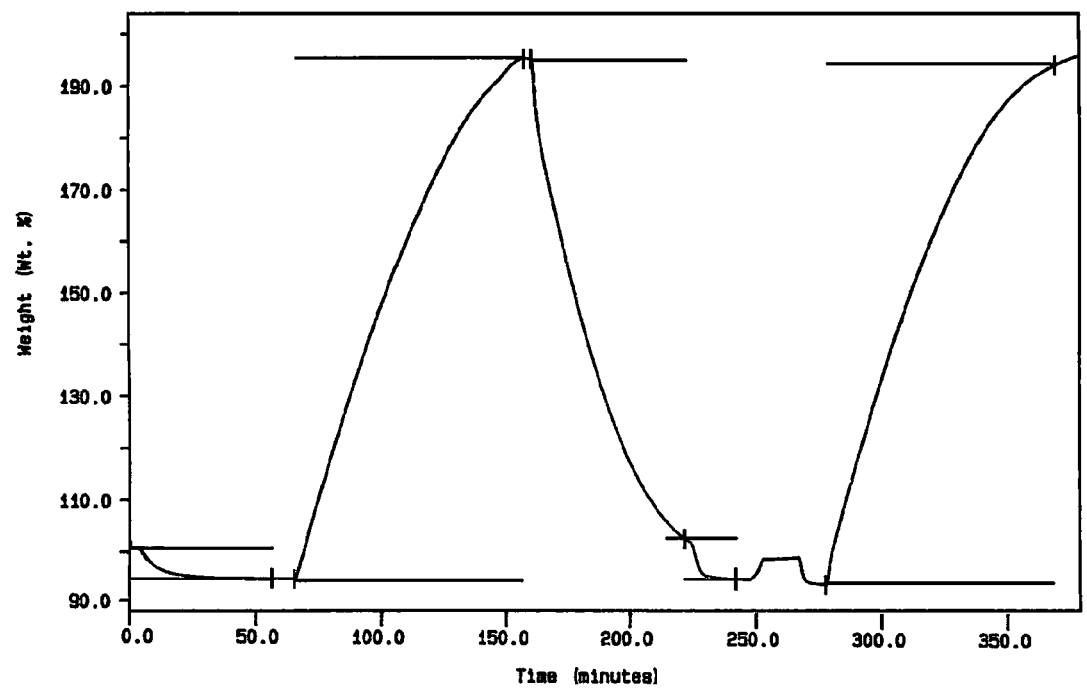
Figure 8. TGA-SO$_2$ Absorption on calcined:
[Mg$_{0.714}$ Fe$_{0.107}$ Al$_{0.179}$(OH)$_2$] (CO$_3$)$_{0.143}$ ·0.828 H$_2$O

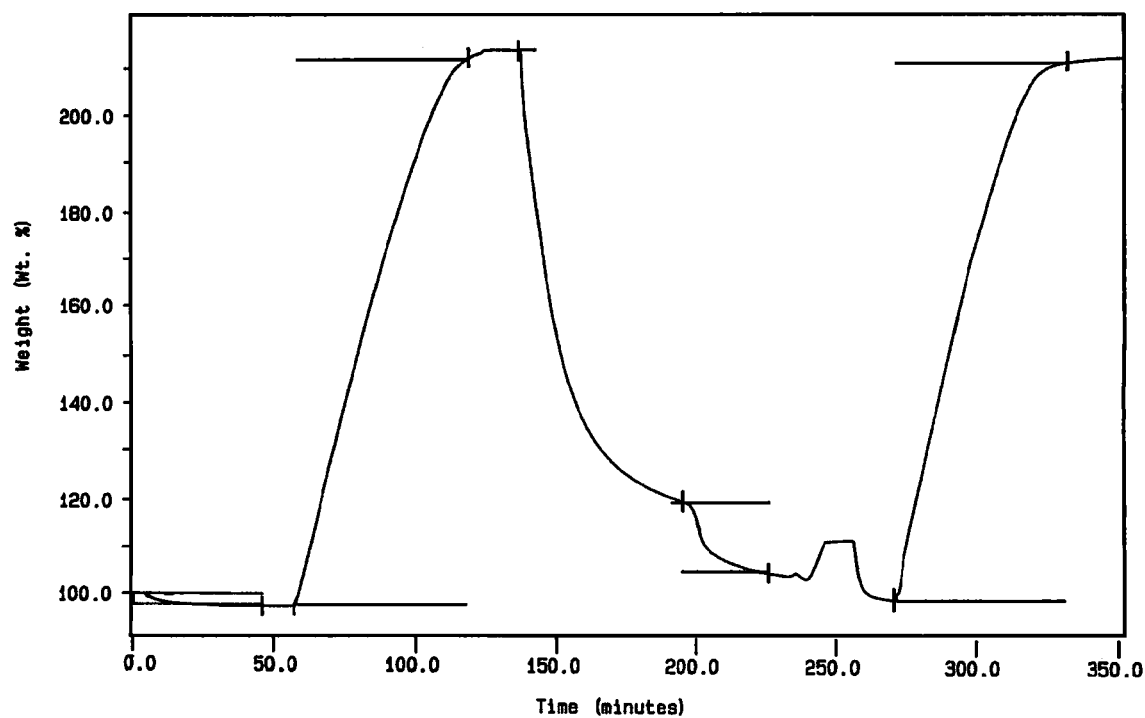
Figure 9. TGA-$SO_2$ Absorption on calcined:
[$Mg_{0.704}$ $Fe_{0.192}$ $Al_{0.104}$ $(OH)_2$] $(CO_3)_{0.148}$ · 0.920 $H_2O$

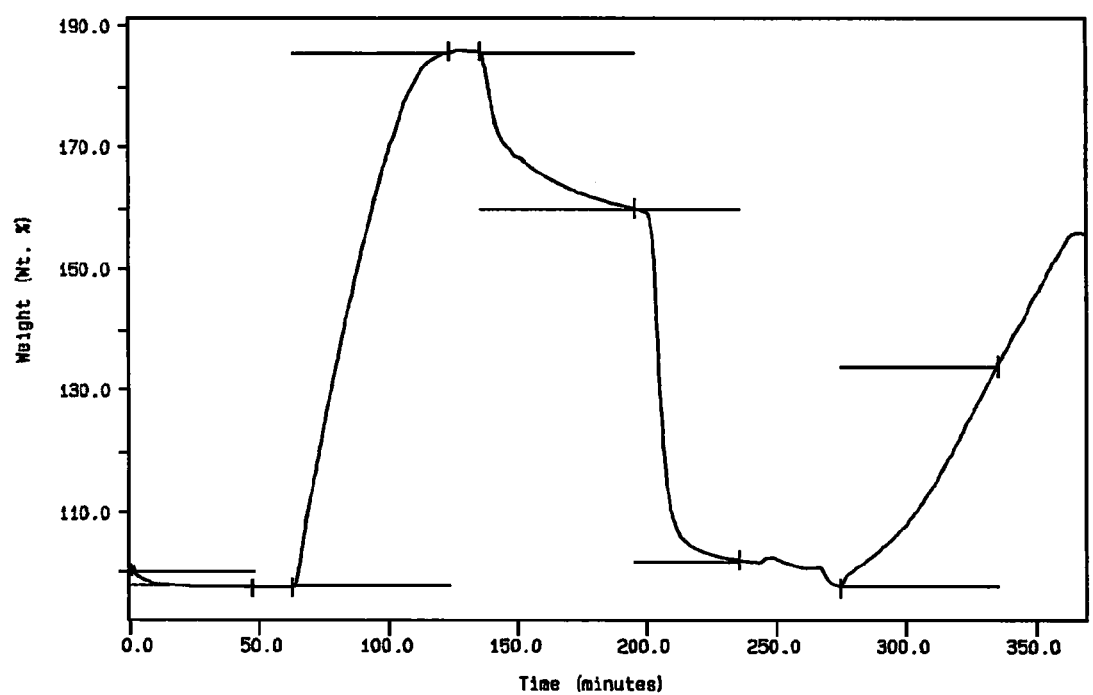
Figure 10. TGA-SO$_2$ Absorption on calcined:
[Mg$_{0.487}$ Zn$_{0.201}$ Al$_{0.312}$ (OH)$_2$] (CO$_3$)$_{0.156}$·0.902H$_2$O

OBTAINING MULTIMETALLIC OXIDES DERIVED FROM HYDROTALCITE TYPE COMPOUNDS

CROSS-REFERENCE TO RELATED APPLICATIONS

This application is a divisional application of Ser. No. 11/326,608, filed Jan. 6, 2006, now U.S. Pat. No. 7,964,175, which is a continuation-in-part of International Application No. PCT/MX2003/000051, with an international filing date of Jul. 7, 2003, the disclosure of which is incorporated herein by reference in its entirety.

FIELD OF THE INVENTION

This invention relates to a procedure for obtaining a series of mixed multimetallic oxides derived from hydrotalcite type compounds. In addition, this invention relates to multimetallic hydrotalcites and their application as sulfur oxide reducing materials ($SO_x$), such as ($SO_2$ or $SO_3$) contained in gas streams, particularly in combustion gases emitted by the regeneration section of the fluid catalytic cracking process (FCC). These materials may also be used for the foregoing purpose in carbon combustion or hydrocarbon combustion gases in energy generating plants and/or chemical plants. The procedure employed improves the absorption capability of $SO_x$ per specific area unit of the material of this invention, the absorption speed and the regeneration speed of the calcined products of such aforementioned hydrotalcites by incorporating tertiary and/or quaternary cations into the plates of these materials.

BACKGROUND OF THE INVENTION

The FCC process effects the transformation of heavy fractions of oil, normally mixtures of atmospheric gas oils and vacuum, into valuable products such as gas, LP gas and light olefins, the latter, inputs of processes from the synthesis of fuels and petrochemicals, and it employs acid catalysts. The FCC industrial units are designed basically with two operation stages, the first one of reaction and the second one of regeneration, and between them the catalyst circulates permanently at a constant speed. Due to the nature of the chemical reactions involved, a carbonaceous subproduct is produced, better known as coke, and this is deposited on the surface on the catalyst surface and de-activates it. The catalyst regeneration takes place by means of the combustion of the coke deposited on the catalyst, and this occurs in the regeneration stage by means of controlled air injection. Coke combustion is an exothermic reaction increasing the catalyst temperature from about 773 to 803K in the reactor up to 923K in the regenerator. The coke combustion process produces, likewise, the oxidation of the sulfur associated to the latter, and this produces in turn the corresponding sulfur oxides in relative proportions very close to thermodynamic equilibrium. These, under the occurring operation conditions, are of approximately 10% $SO_3$ and 90% $SO_2$. In cases where a gas purifying system is not installed, they are emitted together with the combustion gases, into the atmosphere.

Sulfur oxides, named $SO_x$, are toxic gases referring to sulfur dioxide mixtures ($SO_2$) and those of sulfur trioxide ($SO_3$), and these due to the action of ultraviolet light and the humidity of the atmosphere can be transformed into sulfuric acid and generate the so-called acid rain, according to the following chemical reactions:

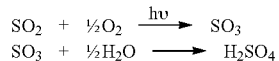

$$SO_2 + \tfrac{1}{2}O_2 \xrightarrow{h\upsilon} SO_3$$
$$SO_3 + \tfrac{1}{2}H_2O \longrightarrow H_2SO_4$$

The extremely negative environmental of the $SO_x$ emissions has been recognized by the international scientific and industrial communities, as well as by various government agencies of most countries in the world.

The number of $SO_x$ emissions produced in the regenerator of an FCC unit is basically a function of the sulfur concentration on the load, the coke yield and the catalyst circulation rate. Approximately between 45 and 55% of the sulfur of the load is converted into $H_2S$ inside the FCC reactor, between 35 and 45% remains liquid products (gasoline, light cyclic oil and heavy oil) and between 5 and 10% is deposited on the catalyst as coke.

It is well known to persons familiar with the FCC process that control of the $SO_x$ emissions can be performed effectively and efficiently by using the catalyst itself, adequately modified with certain compounds or by means of the employment of materials known as $SO_x$ additives, added to the main catalyst inventory in relatively low (normally 10%) and controlled proportions.

Essentially, the materials that may be employed to reduce the $SO_x$ emissions should in principle be active for forming the corresponding sulfate and possess high adsorption capability. This is the case of magnesium oxide or aluminum oxide. On the other hand, thermodynamic calculations indicate that the capture of sulfur trioxide in alkaline metals is much more favorable in comparison with sulfur dioxide (Kocaefe and Karman, Cand. J. Chem. Eng., 63, 971-977 [1985]). This way, in order for a material to be employed efficiently in the FCC process, as an active agent in $SO_x$ additives, it should also possess sufficient activity to catalyze the transformation of sulfur dioxide into sulfur trioxide. Certain metals like cerium or vanadium and their oxides may be employed, due to their recognized activity as oxidation catalysts, especially suitable for oxidation from $SO_2$ to $SO_3$. An essential attribute for an $SO_x$ additive is that referring to its capability for detaching itself from the absorbed sulfate, and this permits regenerating the active entity and thus avoiding the saturation many materials show during the course of their use in the FCC unit. The loosening of sulfates takes place in the reaction stage upon contact of the material with the hydrocarbons found in the environment, or any other reducing agent, such as hydrogen produced as a subproduct.

The $SO_x$ additives that have been most extensively employed in the FCC units are based on magnesium aluminate spinels ($MgAl_2O_4$) containing cerium oxide and vanadium oxide. These additives are described in U.S. Pat. No. 4,790,982 to Yoo et al. and U.S. Pat. No. 4,728,635 to Bhattacharyya et al. These types of additives, however, have shown in general a relatively limited absorption capability, a tendency to lose activity quickly due to the synthetization of the active phase and a slow regeneration speed regarding the residence time there is in the reaction stage in the FCC unit. The need to use materials permitting an increase in the activity of sulfur assimilation has been recognized, both due to a greater amount and due to a higher dispersion of the active metal. One of these materials is constituted by certain anionic clays known as hydrotalcites, comprised essentially of magnesium and aluminum in a sheet structure, and the general formula of the hydrotalcites is the following: $Mg_6Al_2(OH)_{16}(CO_3)4H_2O$. The presence of aluminum atoms produces negative charges in the structure, and these are compensated with interlaminar anions. What is more common, these anions are carbonates, but they may be sulfates, chlorides or others. On the other hand, the Mg/Al atomic relationship in these materials may vary between 1.7 and 5 and it is possible that bivalent or trivalent cations substitute Mg or Al.

The hydrotalcite synthesis is generally performed by means of a co-precipitation of metal salts. A classic preparation consists in mixing an aqueous solution of magnesium and aluminum salts, for example, nitrates or chlorides, and add it to a sodium carbonate solution under continuous stirring. The precipitate formed is submitted to heating for several hours at temperatures between 333 and 473K.

In U.S. Pat. No. 5,750,020 (1998), to Bhattacharyya et al., granted to AMOCO, Co., a collapsed hydrotalcite composition is described, and this may be obtained by calcining a mixed sheet hydroxide having monometallate anions on the interlaminar region. This collapsed composition is comprised substantially of microcrystals represented collectively by means of the formula: $M_{2m}^{2+}Al_{2-p}M_p^{3+}T_rO_{7+r} \cdot s$, where $M^{2+}$ is a divalent metal, $M^{3+}$ is a trivalent metal and T is vanadium, tungsten or molybdenum. The little crystals are so small they cannot be detected by means of conventional X-ray diffraction techniques; however, high resolution electronic microscopy reveals that a considerable portion of the little microcrystals is comprised of a solid solution of molecularly disperse aluminum oxide in the crystalline structure of the divalent metal monoxide. Another portion of the little microcrystals is constituted by the spinel phase. The collapsed composition functions to absorb sulfur oxide and has a comparatively high absorption capability and comparatively high absorption and desorption speeds, and also functions as a catalyst for nitrogen oxide reduction.

In U.S. Pat. No. 5,785,938 (1998) of Pinnavaia T. J. et al. a process to remove and later capture sulfur oxides from gas currents is described, particularly those effluents from the energy generating plants through coal burning, by using double metal hydroxides containing Ni, as recyclable absorbents. The absorbing compositions contain metal components forming stable sulfites and sulfates at a temperature, but they are decomposed at a higher temperature to regenerate the absorbing material.

In U.S. Pat. No. 5,928,496 (1999), a process for the sorption of sulfur oxide by using hydrotalcite type materials, like contact solids, is described. Hydrotalcite type materials are stable when transformed to the crystalline structure of the oxide and are essentially reversible in an exchange of anions. These materials, made up of large crystal sheets and with a high $SO_x$ sorption capacity, are benefited in their sorption properties when modifying them with certain species of organic acid anions, which modify the hydrotalcite/brucite structure.

In U.S. Pat. No. 6,028,023 (2000) of Vierheilig A. A., assigned to Bulldog Technologies Inc., a process for the preparation of hydrotalcite type compounds is described, where a non-hydrotalcite type (or hydrotalcite type) compound is thermally treated and afterwards hydrated to form hydrotalcite type compounds, thus obtaining properties (such as: greater hardness, and/or density) differing from those of hydrotalcite type compounds synthesized by methods reported in the prior state-of-the-art, where non-hydrotalcite type materials (or hydrotalcite type compounds) are not thermally treated in a similar manner or hydrated for forming such hydrotalcite type compounds.

Hydrotalcite type compounds, also called: double or triple laminar metal hydroxides or anionic clays, are materials with laminar structure represented by the following formula:

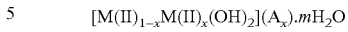

where:
M(II), represents a divalent cation.
M(III), represents a trivalent cation.
A, represents any anion.

Metals form octahedrons joining their edges to form positively charged bidimensional sheets. The positive residual charge is originated in the metal or trivalent cation. To neutralize this residual charge, it is necessary for there to be anions located among the sheets, which may be exchanged by others of chemical composition different from the initial one. Due to the polar and hydrophilic nature of the sheets and depending on the space vacated by the anions, a certain amount of water may be accommodated among the anions and among the sheets.

Specialists in this field will notice that anionic clays are commonly called "mixed metal hydroxides." This expression is derived from the fact that, such as was indicated previously, the positively charged sheets of the metal hydroxides may contain two diverse metal cations in different oxidation states (for example, $Mg^{2+}$, $Al^{3+}$, and so forth). Additionally, and given that the X-ray diffraction patterns of so many anionic clays are similar to the mineral named hydrotalcite, $Mg_6Al_2(OH)_{16}(CO_3) \cdot 4H_2O$, it is common for them to be called "hydrotalcite type compounds." This term has been broadly used in the literature of scientific articles and patents during many years (See, for example, Pausch "Synthesis of Disordered and Al-Rich Hydrotalcite-Like Compounds", *Clays and Clay Minerals*, Vol. 14, 507-510 (1986). Such compounds are frequently referred to as "anionic clays." In fact, the terms "anionic clays", "mixed metal hydroxides" and "hydrotalcite type compounds" are very closely related, if not used indistinctly. On the other hand, U.S. Pat. No. 5,399,329 contains the following sentence: The term "hydrotalcite type" is recognized in its field, defined and used consistently with the use comprised in the monograph type revision articles referred to by Cavani et al." Therefore, and for the purposes of this patent application, the compound term "hydrotalcite type" will be used (unless otherwise indicated) with the understanding that this term should be considered inclusive of anionic clays; the hydrotalcite itself, as well as any member of the class of materials known as "hydrotalcite-type compounds." Moreover, the term "hydrotalcite type" will be abbreviated as "HT" in the present patent application.

It is also known that HT's are decomposed in a predictable manner when heated without exceeding certain temperatures. The resulting materials from decomposition may be re-hydrated (and optionally, re-supplied with certain anions, e.g. $CO_3$=, removed during heating); and likewise, the original HT or a similar one may be reproduced. Products from the decomposition of such heating are frequently referred to as "collapsed" or "meta-stable" hydrotalcite type compounds. If these collapsed or meta-stable materials, however, are heated at certain temperatures higher than 1023K, then the products of the decomposition of such HT's cannot be re-hydrated and/or reconstituted anymore. Therefore, they cannot rebuild the original HT.

Such thermal decomposition process of hydrotalcite type compounds has been studied in detail in academic and patent literature. For example, Miyata, "Physico-Chemical Properties of Synthetic Hydrotalcites in Relation to Composition", Clays and Clay Minerals, Vol. 28, 50-56 (1980).

One of the most difficult problems to solve when wishing to prepare ternary or multimetallic hydrotalcites, in which the three or more cations have actually been incorporated into the laminar structure, is the fact that depending on the chemical nature of the cation, its precipitation speed may be different from that of the other cations, assuming a constant pH. If the precipitation speeds are very different among themselves, non-hydrotalcite separate crystallographic phases will be obtained, that is, the three cations may not be incorporated uniformly into the hydrotalcite layers. If the situation is complicated when we have a binary system (two cations) due to the aforementioned reasons, the situation becomes even more complicated when we have three or more. Therefore, it is difficult to obtain ternary hydrotalcites whose crystallographic phases show that they are pure within an ample range of compositions of the three cations. Even so, there are some reports demonstrating it is possible to obtain them (J. Sánchez-Valente, Doctoral Thesis, "*Synthèse et Characterisation des solides du type hydrotalcite et leurs applications en Catalyse*" IRC, Francia 1999., M. Sánchez-Cantú, Bachelor's Degree Thesis IMP, March 2002).

In scientific literature, there are some examples of ternary hydrotalcites, that is, those made up in their laminar composition of three different cations. However, these examples are scarce, since a greater effort has been devoted to the study of binary hydrotalcites. For example, Kooli et al. (1995) have reported the preparation of Ni—Al—Cr and Ni—Al—Fe hydrotalcites containing carbonate anions in their interlaminar region. These ternary hydrotalcites, where the traditional trivalent cation ($Al^{3+}$) is partially substituted by $Fe^{3+}$ or $Cr^{3+}$ cations, were obtained by means of a co-precipitation with sodium carbonate and sodium hydroxide at a pH=10, at 333K, followed by a hydrothermal treatment at 423K. The ternary hydrotalcites were obtained in pure crystallographic phases when the following atomic relationship ranks were maintained between the cations: $3.6 \leq Ni/(Cr+Al) \leq 6.8$ or $2.3 \leq Ni/(Fe+Al) \leq 9.9$; beyond these ranks other non-hydrotalcite phases were detected.

The foregoing group of authors (F. Kooli et al., 1995) have also described the preparation of ternary hydrotalcites where the divalent cation is partially substituted by others, for example Mg—Zn—Al and Zn—Cu—Al. In this procedure, the solids are obtained by means of co-precipitation with sodium carbonate and sodium hydroxide at 333K and pH=10. The atomic relationships between which it is possible to obtain crystallographically pure hydrotalcite phases were the following: $1.3 \leq (Mg+Zn)/Al \leq 5.9$ and $2.7 \leq (Zn+Cu)/Al \leq 3.1$; however, even within these ranks there were occasional non-hydrotalcite phases.

Cu—Ni—Al ternary hydrotalcites, where the divalent cation is partially substituted by another one and with carbonate and nitrate anions in the interlaminar region, have been obtained by means of co-precipitation with an aqueous solution of NaOH, at pH=10 and room temperature, as is reported by A. Alejandre et al. (2001). The precipitate obtained was aged at 343K during 2 h. However, in the case of these ternary hydrotalcites, where Cu is from 0.11 to 0.32, Ni is 0.15 to 0.36 and Al is constant and equal to 3, that is, in order to maintain a divalent/trivalent cation atomic relationship=0.16, their diffraction patterns always show different phases from those of hydrotalcite, or mixtures of such phases.

SUMMARY OF THE INVENTION

A process for obtaining mixed multimetallic oxides derived from hydrotalcite type compounds has been discovered involving laminar metallic hydroxides constituted by three or four metallic cations, forming part of the sheets of the hydrotalcite type material represented by the following formula:

$$[M(II)_{1-x-y-z}M(II)'_x M(III)_y M(III)'_z(OH)_2](A^{n-}_{y+z/n}) \cdot m H_2O, \text{ where:}$$

[M(II)+M(II)']/[(M(II)+M(III)'], is the molar relationship between the divalent cations and the trivalent cations, and it is found between 0.5 and 10.

M(II) represents an element of group 2, 6-12 of the periodic table with valence equal to two.

M(II)' represents an element of group 2, 6-12 of the periodic table with valence equal to two or three, and this may be equal to M(II) but with different valence M(III) represents an element of group 4-8, 13 with valence equal to 3 and different from M(II) and M(II)'.

M(III)' represents an element of group 4-8, 13 with valence equal to 3 and different from M(II) and M(III) or equal to M(III) but with different valence.

A, represents any anion located between the sheets comprised of the aforementioned cations.

n−, represents the negative electronic charge of the interlaminar anion, and it may be from −1 to −8); x=0.01 up to 0.99; y=0.01 up to 0.99 and z=0.01 up to 0.99.

The preparation of the multimetallic hydrotalcites which are the subject of this invention comprises the following: (1) Aqueous or organic solutions containing three or more cations are prepared, where their precursor compounds are oxides, hydroxides, chlorides, nitrates, and/or acetates or any combination among them; (2) An alkaline solution of 0.5 to 10 molarity, preferably from 1-5 molar, of KOH, $K_2CO_3$, $(NH_4)_2CO_3$, $NH_4(OH)$, urea or any other alkaline compound, except sodium, or any combination among them is prepared; (3) Solutions (1) and (2) are combined slowly to cause the co-precipitation of the cations in the form of hydroxides at a pH between 7 and 12, at a temperature between 293 and 373 K; (4) The precipitate containing the hydrotalcites is washed with water, until there is the removal of the non-precipitated ions; (5) Drying between 333 and 473K, with air, nitrogen or under vacuum, or any combination among them; (6) Finally, the hydrotalcites are calcined between 573 and 1273K, with a current of air, oxygen, nitrogen or any combination.

The resulting multimetallic oxides in accordance with the invention may appear in any physical form; preferably as powders with a particle size between 20 and 120 microns, preferably between 60 and 80 microns, and densities between 0.7 and 1.0 g/cm$^3$, preferably between 0.8 and 0.9 g/cm$^3$.

Thus, this invention involves a procedure for obtaining a series of mixed multimetallic oxides derived from hydrotalcite type compounds. Also, this invention involves the preparation of multimetallic hydrotalcites, their physical-chemical characteristics and their application as sulfur oxide reducing materials, $SO_x$ such as $SO_2$ or $SO_3$ contained in gas currents, particularly in the combustion gases emitted by the regeneration section of the Fluid Layer Catalytic Cracking Process (FCC). The materials of this invention may be used also for the above purpose in the combustion gases of coal or hydrocarbon combustion in energy generating plants and/or chemical plants. This invention involves the following: (a) improved $SO_x$ absorption capability per unit of specific area of multimetallic hydrotalcite obtained; (b) improved absorption speed and regeneration speed of the calcined products of the hydrotalcites mentioned, when incorporating ternary and/or quaternary cations into the sheets of these precursor materials. In order to discern the composition effect of these multimetallic hydrotalcites in their performance as efficient oxidizers-reducers of $SO_x$ compounds, a combination of physical and chemical methods were applied to characterize them, namely, X-ray diffraction, chemical analyses, texture analyses, a microcalorimeter study of $CO_2$ adsorption, and mainly the oxidation-reduction of $SO_2$.

BRIEF DESCRIPTION OF THE DRAWINGS

In order to show the performance as $SO_2$ absorbers of the multimetallic oxides obtained from hydrotalcite type compounds, reference is made to the figures herein included.

FIGS. 1 to 4 show the X-ray diffraction patterns of the solids synthesized in this invention, which are characteristic of pure hydrotalcite type compounds, where the formation of crystalline phases additional to the hydrotalcite type structure is not observed, thus indicating that with the procedure of this invention it is possible to incorporate three, four or more cations on the sheets of the hydrotalcite type materials.

FIG. 5 represents the plan of the gravimetric evaluation process of solids in the oxidation-reduction of $SO_2$. This method allows us to compare and discriminate the oxidizing-reducing properties of the solids subject matter of this invention and commercial ones.

FIGS. 6 to 10 exemplify the gravimetric study of the absorption-reduction process of $SO_2$, described previously, in multimetallic oxides obtained as of the calcining, at 923 K, of the precursor multimetallic hydrotalcites.

DETAILED DESCRIPTION OF THE INVENTION

This invention is related to a process for obtaining a series of mixed multimetallic oxides derived from hydrotalcite type compounds and their use as absorbent materials, capable of being regenerated, to remove or reduce the sulfur oxides ($SO_x$) contained in gas currents, preferably in combustion gases emitted by the regeneration section of the fluid catalytic cracking process (FCC). The syntheses of absorbent materials or multimetallic hydrotalcite type compounds of this invention are represented by the following formula:

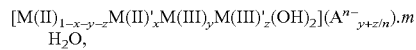

where: [M(II)+M(II)']/[(M(III)+M(III)'], is the molar relationship between the divalent cations and the trivalent cations and is found between 0.5 and 10; M(II), represents an element of group 2, 6-12 of the periodic table with valence equal to two; M(II)', represents an element of group 2, 6-12 of the periodic table with valence equal to two or three, and this may be equal to M(II) but with a different valence, M(III), represents an element of group 4-8, 13 with valence equal to 3 and different from M(II) y M(II)', M(III), represents an element of group 4-8, 13 with valence equal to 3 and different from M(II) and M(III) or equal to M(III) but with different valence.

A, represents any anion located between the sheets comprised of the aforementioned cations.

n−, represents the negative electronic charge of the interlaminar anion and may be from −1 to −8.

x=0.01 up to 0.99
y=0.01 up to 0.99
z=0.01 up to 0.99

The value of m is not controlled during the synthesis of the hydrotalcite-like compounds, but is inherent to the material formed. Preferably, m is in the range of greater than 0 and less than or equal to 2, namely, m is >0 and ≦2.

The procedure of this invention is characterized in that it is performed as follows: (1) preparation of aqueous or organic solutions containing at least three or up to four cations, where the precursor compounds may be oxides, hydroxides, chlorides or any combination of them; (2) preparation of the alkaline solutions from 0.5 to 10 molar, preferably from 1 to 5 molar of $KOH$, $K_2CO_3$, $(NH_4)OH$, $(NH_4)_2CO_3$, urea or any alkaline compound, except a sodium compound, or any combination of such alkaline compounds may be used; (3) slowly combining solutions (1) and (2) until precipitation of the cations in the form of hydroxides is caused at a pH between 7 and 12, preferably between 8 and 10, at a temperature between 293 and 373K, preferably between 333 and 353K; (4) mechanical agitation at temperatures between 293 and 373K, preferably between 333 and 353K, from 14 to 20 hours; (5) washing of the precipitate with enough water to eliminate all of the non-precipitated ions; (6) drying between 333 and 473K with air, oxygen or nitrogen, or any combination of them; (7) finally, calcining of the obtained material is effected, between 573 and 1273K, or between 673K and 1073K, preferably between 850K and 950K, or between 673 and 973K, or between 773 and 973K, in air, oxygen, nitrogen or any combination thereof, such as in an air atmosphere, for 1 to 24 hours, preferably 4 to 8 hours.

The mixed multimetallic oxides of the present invention are characterized by having $CO_2$ (ΔH) adsorption heats, measured at room temperature of between 50 and 150 KJ/mol, preferably between 60 and 120 KJ/mol with a number of basic sites between 0.2 and 5.0 μmol $CO_2$ adsorbed/$m^2$, preferably between 0.4 and 3.0 μmol $CO_2$ adsorbed/$m^2$. Further, the multimetallic oxides can appear in any physical form; preferably as powders with a particle size between 20 and 120 microns, preferably between 60 and 80 microns, and densities between 0.7 and 1.0 g/$cm^3$, preferably between 0.8 and 0.9 g/$cm^3$. Additionally, the present mixed multimetallic oxides have capacities of total absorption of sulfur oxides between 2.5 and 30% weight of S/$m^2$ of absorbent material, at 923K, preferably between 5 to 20% weight of S/$m^2$ of absorbent material, at 923K. Also, they have $SO_2$ or $SO_3$ absorption speeds of 0.25 at 4.0 $min^{-1}$ at 923 K, preferably from 1.3 to 3.44 $min^{-1}$ at 923 K. Further, the mixed multimetallic oxides have a reduction speed between 0.2 and 5 $min^{-1}$, at between 793 and 873 K, preferably from 2 to 3.25 $min^{-1}$ at 873K. Likewise, they have a reduction percentage (of removal of absorbed $SO_x$) between 30 and 100% at 873K, preferably from 80 to 96% at 873K.

The solids obtained with different concentrations of metallic cations in their laminar structure are classified in the series named: MgFeAl, MgZnAl, MgNiAl and MgZnAlFe; and in some cases binary hydrotalcites were prepared (MgAl, ZnAl, MgFe, and so forth) to compare them with the multimetallic ones subject matter of this invention. Material characterization techniques involve the determination of important parameters, such as surface area, pore diameter, pore volume, structural arrangements, crystallinity, crystalline phase composition, sulfur absorption and thermal analysis.

The elementary analysis for calculating the developed formula of the multimetallic hydrotalcites was effected by atomic absorption, X-ray analysis in a diffractometer with CuKα radiation (1.5406 Å) to identify the crystallographic phases of the solids and the textural properties in an equipment, ASAP, at 77 K by means of the adsorption-desorption of nitrogen.

The materials obtained presented the patterns of X-ray diffraction characteristic of the pure multimetallic hydrotalcites subject matter of this invention, as shown in FIGS. 1 to 4; where the formation of compounds additional to the hydrotalcite type structure is not observed, and by this we wish to indicate that with the procedure of this invention it is possible to incorporate three, four or more cations on the sheets of hydrotalcite type materials. It is also demonstrated that the hydrotalcites, constituted by three or more cations in their laminar structure, are converted after being calcined between 673 and 973K, into materials with improved basic properties in comparison with a hydrotalcite constituted of only two cations.

It is important to emphasize that the product of calcining a conventional binary hydrotalcite, for example, Mg/Al, may function as an absorbent material for $SO_x$ in gas currents, the removal of the sulfites or sulfates formed, or in other words, the regeneration of the absorbent material, becomes difficult due to the fact that the sulfates are strongly interlocked to the material mentioned. Hence, we need a third or up to a fourth highly disperse cation, forming part of the layers of the initial hydrotalcite, to modulate the basic strength of the sites where $SO_x$ acid molecules interact and/or which they capture.

This invention demonstrates that the reduction speed (that is, the removal of sulfates of absorbent material) increases considerably in calcined ternary or quaternary hydrotalcites. This parameter is crucial for the commercial utilization of these materials as $SO_x$ reducing additives in the FCC process, since contact times are usually between close to 2 to 5 seconds with reducing gases. The latter are the hydrocarbons and/or oxygen involved in the FCC process.

Microcalorimetric Procedure to Measure the Heat Emitted or Absorbed in the Hydrotalcites in $CO_2$ Adsorption.

To measure the heat emitted or absorbed in the materials subject matter of this invention, a flow isothermal calorimeter of the Tian-Calvet type was used: The procedure is performed as follows: (a) All hydrotalcites obtained according to Examples 1 to 24 were thermally treated at 723 K during 5 hours, under a flow of nitrogen of 7 L/h, with a temperature ramp of 10 K/min., (b) The materials were placed inside the microcalorimetric cell, by using a glove bag in an argon atmosphere, in order to avoid contact of the solid with the air and consequently its de-activation, (c) Afterwards, the cell was heated in the pretreatment oven, until the necessary vacuum was reached to initiate the experiment (10-5 Torr), (d) Later, this was carried on to room temperature by keeping the vacuum in the cell, which was transferred to the microcalorimeter (Tian-Calvet), e) Afterwards, successive dosages of $CO_2$ of a known volume were sent to the study sample, thus awaiting thermal equilibrium after every dosage. The pressure was determined with an absolute pressure meter (BARATRON), until there was a residual equilibrium pressure of the order of 0.14 Torr.

Results of $CO_2$ Adsorption.

Table 1 presents the results of $CO_2$ adsorption in the calcined hydrotalcites, and these were previously treated according to the protocol described in the preceding experimental part. $CO_2$ is an acid gas molecule and it is adsorbed only on the basic sites. To examine the effect of the different metallic cations on the solid basic quality, and at the same time the effect of the precursor salts of the metallic cations on the basic properties of the same, the samples were studies starting with nitrates and chlorides with different cations. The samples synthesized as of chlorides were exchanged by following the anionic exchange protocol described in this process. It is important to mention that the solids obtained from chlorated salts without being exchanged practically do not adsorb $CO_2$, and this indicates that the active basic sites are inhibited by the presence of chlorine.

An important result of this study, in the case of hydrotalcites containing only Mg and Al, is that there is almost no difference whatsoever between the number and the strength of basic sites, obtained starting either with nitrated or chlorated salts. On the other hand, in the case of hydrotalcite type compounds (HT), containing either Mg and/or Fe and/or Ni and/or Cu and/or Zn and/or Cr, there is a considerable difference between the solids obtained as of nitrates or chlorides. Solids synthesized as of chlorides present greater $CO_2$ adsorption enthalpies, and this indicates they are compounds of a greater strength and number of basic sites than those obtained starting with nitrates: When chlorated salts are used, the number of sites oscillates between 0.5-3.0 μmol $CO_2$ adsorbed/$m^2$ with adsorption enthalpies comprised within a range of 60-120 KJ/mol, the number and strength of sites of the calcined solids will be determined by the nature and proportion of the cations present in the structure of the precursor HT type compound. Also varying the composition of the precursor HT, it is possible to obtain solids with a number of sites going from 0.4-1.5 μmol $CO_2$ within a range of ΔH adsorption: 60-110 KJ/mol. These results show that the number and strength of the active basic sites may be modulated within an ample range of energy.

TABLE 1

Microcalorimetric results of $CO_2$ adsorption on calcined hydrotalcite-like compounds (923K/4 h).

| Sample | μmolCO$_2$/ $m^2$* | ΔH (KJ/mol) |
|---|---|---|
| $[Mg_{0.714}Fe_{0.107}Al_{0.179}(OH)_2](CO_3)_{0.143} \cdot 0.83H_2O$ | 1.5 | 60-110 |
| $[Mg_{0.651}Fe_{0.063}Al_{0.286}(OH)_2](CO_3)_{0.174} \cdot 0.82H_2O$ | 1.1 | 60-100 |
| $[Mg_{0.704}Fe_{0.192}Al_{0.104}(OH)_2](CO_3)_{0.148} \cdot 0.92H_2O$ | 1.3 | 60-105 |
| $[Mg_{0.493}Zn_{0.165}Al_{0.342}(OH)_2](CO_3)_{0.171} \cdot 0.98H_2O$ | 0.8 | 60-100 |
| $[Mg_{0.478}Zn_{0.232}Al_{0.290}(OH)_2](CO_3)_{0.145} \cdot 0.86H_2O$ | 0.6 | 60-95 |
| $[Mg_{0.589}Ni_{0.111}Al_{0.300}(OH)_2](CO_3)_{0.150} \cdot 0.88H_2O$ | 1.3 | 60-110 |
| $[Mg_{0.457}Ni_{0.292}Al_{0.251}(OH)_2](CO_3)_{0.126} \cdot 0.85H_2O$ | 1.0 | 60-90 |
| $[Mg_{0.658}Cu_{0.098}Al_{0.244}(OH)_2](CO_3)_{0.122} \cdot 0.69H_2O$ | 0.9 | 60-80 |
| $[Mg_{0.17}Ni_{0.51}Al_{0.32}(OH)_2](CO_3)_{0.16} \cdot 0.91H_2O$ | 1.3 | 60-110 |
| $[Mg_{0.744}Al_{0.256}(OH)_2](CO_3)_{0.128} \cdot 0.85H_2O$ | 1.2 | 60-100 |
| $[Mg_{0.730}Al_{0.270}(OH)_2](CO_3)_{0.135} 0.71H_2O**$ | 1.4 | 60-100 |
| $[Mg_{0.688}Fe_{0.311}(OH)_2](CO_3)_{0.160} \cdot 0.80H_2O$ | 0.5 | 60-100 |
| $[Mg_{0.670}Fe_{0.330}(OH)_2](CO_3)_{0.165} \cdot 0.80H_2O**$ | 2 | 60-100 |
| $[Mg_{0.69}Cr_{0.31}(OH)_2](CO_3)_{0.173} \cdot 0.84H_2O$ | 0.4 | 60-105 |
| $[Mg_{0.76}Cr_{0.24}(OH)_2](CO_3)_{0.120} \cdot 0.79H_2O**$ | 3.5 | 60-120 |
| $[Co_{0.63}Al_{0.37}(OH)_2](CO_3)_{0.185} \cdot 1.1H_2O$ | 0.48 | 60-80 |
| $[Cu_{0.751}Al_{0.249}(OH)_2](CO_3)_{0.418} \cdot 1.41H_2O$ | 1.5 | 60-78 |
| $[Ni_{0.833}Al_{0.167}(OH)_2](CO_3)_{0.0835} \cdot 0.68H_2O$ | 0.8 | 60-90 |
| $[Zn_{0.75}Al_{0.25}(OH)_2](CO_3)_{0.125} \cdot 0.84H_2O**$ | 0.5 | 60-96 |

*Only the $CO_2$ adsorbed amount >60 KJ/mol was considered as a real chemisorption.
**This solids were synthesized from chloride salts and exchanged post-synthesis with $CO_3$ anions.

Evaluation of Multimetallic Hydrotalcites in the Oxidation-reduction of $SO_2$.

By means of this method, the absorption-reduction efficiency was determined in the multimetallic hydrotalcites of this invention, of sulfur oxides ($SO_x$), by means of thermogravimetric analysis. The temperature interval of every test was performed from the room temperature up to 923K. The temperature employed depended on the absorption-reduction properties of the materials studied.

The analysis equipment consists of the following:
Perkin-Elmer thermo-gravimetric analyzer, TGA-7 model: This consists mainly of an ultrasensitive microscale, measuring weight changes from 0.1 μg up to 1300 mg; and of a high temperature oven, whose operation range is from 298 to 1773K, and thus an excellent accuracy is obtained.
TAC 7/DX thermal analysis controlling instrument.
Manual set of valves for the processes of oxidation-reduction absorption and cleansing of the system.

To evaluate the hydrotalcites, 40-60 mg was taken from the samples presented on Table 2, and these were transferred to a temperature of 923 K in an air atmosphere in order for them to be activated and stabilized. The absorption of $SO_2$ in the material is effected by exposure to a mixture of $SO_2$ (1.0% Vol.)/air at the same temperature. Once total saturation has finished, the system is purged with $N_2$. Immediately following, the sample is reduced with a current of $H_2$ at 823 and 923K, thus obtaining again the initial calcined hydrotalcite, and this may be submitted to a new absorption-reduction cycle. With this test the total adsorption capacity is determined, as well as the adsorption speed and reduction speed, besides the material stability in several absorption cycles (FIG. 5).

Some results with this evaluation method are presented in FIGS. 6 to 10.

With this test, the following parameters are determined:

Total Absorption: The maximum amount of $SO_2$ (% weight) absorbed until reaching equilibrium at a given time (the latter depends on the sample studied).

Absorption speed: Amount of $SO_2$ (% weight) absorbed per time unit, calculated for all cases after 30 minutes.

% Reduction: Amount of $SO_2$ reduced at a given temperature (823 or 923 K).

Reduction speed: Amount of $SO_2$ (% weight) absorbed per time unit at 823 and/or 923 K.

Catalytic Stability: Intrinsic capability of the solid to recover its initial absorption capacity.

The results of these tests are summarized on Tables 2 and 3.

From the above described parameters, one of the most important and crucial ones for optimal performance of the additives in actual operation conditions is the reduction speed, since it is limited by the temperature of the riser reaction zone (its acronym in English) of the FCC process, and this oscillates between 793 and 873K. Consequently, solids that present a greater reduction speed at temperatures situated within this range are better than those that need greater activation temperatures. From the results of Table 2, it is demonstrated that said speed may be modulated depending on the nature and content of the metallic cations constituting the solid, thus obtaining results up to 9.7 times greater when compared with the better ones obtained in commercial additives, evaluated under the same conditions.

On Tables 2 and 3, it is demonstrated that the reduction speeds at 823 K of the ternary hydrotalcites with iron (series MgFeAl) are (between 9.7 and 14.7 times) faster than that of the binary MgAl hydrotalcite or that of commercial additives. The amount of $SO_2$ in % weight that the MgFeAl ternary series of hydrotalcites can absorb is from 1.1 to 2.7 times greater than that of the best of the commercial additives (Additive C). This means that in one application lesser amounts of multimetallic hydrotalcite will be required, subject matter of this invention, in order to offer the same $SO_2$ absorption levels, thus contributing to the economy of the process. Additionally in this same series, the $SO_2$ absorption speeds, although they are not so crucial as the $SO_x$ reduction speeds, as was explained previously, improve 1.3 and 2.0 times in comparison with the best of the additives (Additive C).

From the results on Table 3, it may be observed that the MgFeAl multimetallic hydrotalcite series has between 83 to 94% reduction at 823 K, whereas the additives have only between 20 to 29% at 823 K. Commercial additives need greater temperatures (923 K) to reach elevated reduction levels.

The MgZnAl multimetallic hydrotalcite series presented reduction speeds between 1.2 and 3.4 times greater than the MgAl binary hydrotalcite or commercial additives, although lower than the MgFeAl series, as is shown on Table 2. The absorption speeds were between 0.9 and 1.8 times grater than the best of the commercial additives (Additive C) and their capturing capacities were from 0.67 to 2 times better than the best of the commercial additives (Additive C).

In general, from Tables 2 and 3, it is clear that the type and amount of ternary cation has a positive impact on most of the evaluation parameters in order to be able to determine whether or not an $SO_x$ absorbent is good.

TABLE 2

Total absorption and absorption-reduction rates of $SO_2$ oxo-reduction test on calcined HT's (923K/4 h).

| Sample | Total Absorption* (% Wt $SO_2/m^2$) | [1]Absorption rate (1/min) | Reduction rate (1/min) 823K | 923K |
|---|---|---|---|---|
| $[Mg_{0.651}Fe_{0.063}Al_{0.286}(OH)_2](CO_3)_{0.174}\cdot 0.82H_2O$ | 10 | 1.44 | 2.13 | 0.10 |
| $[Mg_{0.714}Fe_{0.107}Al_{0.179}(OH)_2](CO_3)_{0.143}\cdot 0.83H_2O$ | 13 | 1.52 | 2.13 | 0.26 |
| $[Mg_{0.704}Fe_{0.192}Al_{0.104}(OH)_2](CO_3)_{0.148}\cdot 0.92H_2O$ | 25 | 2.24 | 2.72 | 0.49 |
| $[Mg_{0.610}Zn_{0.090}Al_{0.290}(OH)_2](CO_3)_{0.15}\cdot 0.73H_2O$ | 6 | 1.02 | 0.27 | 1.65 |
| $[Mg_{0.493}Zn_{0.165}Al_{0.342}(OH)_2](CO_3)_{0.171}\cdot 0.98H_2O$ | 11 | 1.97 | 0.68 | 1.79 |
| $[Mg_{0.487}Zn_{0.201}Al_{0.312}(OH)_2](CO_3)_{0.156}\cdot 0.90H_2O$ | 14 | 1.94 | 0.72 | 1.90 |
| $[Mg_{0.478}Zn_{0.232}Al_{0.290}(OH)_2](CO_3)_{0.145}\cdot 0.86H_2O$ | 18 | 1.88 | 0.74 | 1.97 |
| $[Mg_{0.589}Ni_{0.111}Al_{0.300}(OH)_2](CO_3)_{0.150}\cdot 0.89H_2O$ | 4 | 1.08 | 0.41 | 1.47 |
| $[Mg_{0.483}Ni_{0.222}Al_{0.295}(OH)_2](CO_3)_{0.147}\cdot 0.88H_2O$ | 7 | 1.14 | 0.89 | 1.43 |
| $[Mg_{0.457}Ni_{0.292}Al_{0.251}(OH)_2](CO_3)_{0.126}\cdot 0.85H_2O$ | 2 | 0.56 | 0.30 | 0.43 |
| $[Mg_{0.307}Cu_{0.118}Al_{0.578}(OH)_2](CO_3)_{0.289}\cdot 0.80H_2O$ | 4 | 1.69 | 0.15 | 0.44 |
| $[Mg_{0.658}Cu_{0.098}Al_{0.244}(OH)_2](CO_3)_{0.122}\cdot 0.69H_2O$ | 2 | 1.29 | 0.17 | 0.42 |
| $[Mg_{0.600}Cu_{0.148}Al_{0.252}(OH)_2](CO_3)_{0.126}\cdot 0.71H_2O$ | 2 | 1.30 | 0.21 | 0.21 |
| Binary hydrotalcites and Commercial Additives*** | | | | |
| $[Mg_{0.744}Al_{0.256}(OH)_2](CO_3)_{0.128}\cdot 0.85H_2O$ | 24 | 3.42 | 0.22 | 1.41 |
| $[Mg_{0.688}Fe_{0.311}(OH)_2](CO_3)_{0.160}\cdot 0.80H_2O$ | 27 | 3.44 | 3.25 | —** |
| $[Zn_{0.75}Al_{0.25}(OH)_2](CO_3)_{0.125}\cdot 0.84H_2O$ | 35 | 1.78 | 1.10 | —** |
| $[Ni_{0.833}Al_{0.167}(OH)_2](CO_3)_{0.0835}\cdot 0.68H_2O$ | 3 | 0.25 | 1.15 | —** |
| Commercial Additive A | 7 | 0.98 | 0.22 | 1.60 |
| Commercial Additive B | 8 | 1.02 | 0.21 | 1.26 |
| Commercial Additive C | 9 | 1.09 | 0.21 | 1.73 |

*Evaluated at 923K

**The samples were completely reduced at 873K,

[1]In all cases, the rate was measured at 30 min.

Commercial catalyst A is mainly constituted of $MgAl_2O_4$, commercial catalysts B and C are made with hydrotalcite doped with Ce and V.

***Binary hydrotalcites and commercial additives were only used as references and they are not object of this patent application.

TABLE 3

Total absorption, regeneration and reduction percentage of $SO_2$ oxo-reduction test on calcined HT's (923K/4 h).

| Sample | Total Absorption* ($gSO_2$/gcat) | Reduction (%) 823K | Reduction (%) 923K | Regeneration (%) |
|---|---|---|---|---|
| $[Mg_{0.651}Fe_{0.063}Al_{0.286}(OH)_2](CO_3)_{0.174} \cdot 0.821H_2O$ | 1.031 | 94 | 6 | 98 |
| $[Mg_{0.714}Fe_{0.107}Al_{0.179}(OH)_2](CO_3)_{0.143} \cdot 0.828H_2O$ | 1.013 | 92 | 8 | 100 |
| $[Mg_{0.704}Fe_{0.192}Al_{0.104}(OH)_2](CO_3)_{0.148} \cdot 0.920H_2O$ | 1.145 | 83 | 17 | 98 |
| $[Mg_{0.610}Zn_{0.090}Al_{0.290}(OH)_2](CO_3)_{0.15} \cdot 0.73H_2O$ | 0.774 | 14 | 86 | 55 |
| $[Mg_{0.493}Zn_{0.165}Al_{0.342}(OH)_2](CO_3)_{0.171} \cdot 0.978H_2O$ | 0.836 | 30 | 64 | 32 |
| $[Mg_{0.487}Zn_{0.201}Al_{0.312}(OH)_2](CO_3)_{0.156} \cdot 0.902H_2O$ | 0.881 | 30 | 65 | 41 |
| $[Mg_{0.478}Zn_{0.232}Al_{0.290}(OH)_2](CO_3)_{0.145} \cdot 0.857H_2O$ | 0.918 | 29 | 67 | 43 |
| $[Mg_{0.589}Ni_{0.111}Al_{0.300}(OH)_2](CO_3)_{0.150} \cdot 0.885H_2O$ | 0.656 | 30 | 66 | 104 |
| $[Mg_{0.483}Ni_{0.222}Al_{0.295}(OH)_2](CO_3)_{0.147} \cdot 0.876H_2O$ | 0.842 | 42 | 55 | 104 |
| $[Mg_{0.457}Ni_{0.292}Al_{0.251}(OH)_2](CO_3)_{0.126} \cdot 0.849H_2O$ | 0.293 | 54 | 44 | 134 |
| $[Mg_{0.307}Cu_{0.118}Al_{0.578}(OH)_2](CO_3)_{0.289} \cdot 0.803H_2O$ | 0.377 | 16 | 46 | 168 |
| $[Mg_{0.658}Cu_{0.098}Al_{0.244}(OH)_2](CO_3)_{0.122} \cdot 0.687H_2O$ | 0.309 | 21 | 49 | 154 |
| $[Mg_{0.600}Cu_{0.148}Al_{0.252}(OH)_2](CO_3)_{0.126} \cdot 0.709H_2O$ | 0.227 | 33 | 36 | 202 |
| Binary Hydrotalcites and Commercial Additives** | | | | |
| $[Mg_{0.744}Al_{0.256}(OH)_2](CO_3)_{0.128} \cdot 0.850H_2O$ | 1.214 | 9 | 52 | 96 |
| $[Mg_{0.688}Fe_{0.311}(OH)_2](CO_3)_{0.160} \cdot 0.800H_2O$ | 1.050 | 96 | 4 | 102 |
| $[Zn_{0.75}Al_{0.25}(OH)_2](CO_3)_{0.125} \cdot 0.840H_2O$ | 0.666 | 82 | 5 | —*** |
| $[Ni_{0.833}Al_{0.167}(OH)_2](CO_3)_{0.0835} \cdot 0.683H_2O$ | 0.294 | 100 | 0 | —*** |
| Commercial Additive A | 0.644 | 26 | 73 | 100 |
| Commercial Additive B | 0.550 | 29 | 68 | 114 |
| Commercial Additive C | 0.665 | 20 | 80 | 109 |

*Evaluated at 923K
**Binary hydrotalcites and commercial additives were only used as references and they are not object of this patent request
***The activity was not regenerated at all. The regeneration is calculated from a second absorption cycle.
Commercial catalyst A is mainly constituted of $MgAl_2O_4$, commercial catalysts B and C are made with hydrotalcite doped with Ce and V.

To conclude, as if deriving from the results of Tables 2 and 3, it is possible to state that a third or up to a fourth cation on the sheets of the multimetallic hydrotalcites offers a modulating function between the basic strength necessary to retain the $SO_x$ and its commitment to loosen this molecule at relatively low temperatures and to regenerate the material.

It is important to emphasize that the product of calcining a conventional binary hydrotalcite, for example, constituted by magnesium and aluminum, may function as an absorbent material of $SO_x$ in gas currents. Removal of the sulfites or sulfates formed, or in other words the regeneration of the absorbing material, is rendered difficult due to the fact that the sulfites or sulfates are strongly interlinked to the material mentioned. Therefore, it is important for the hydrotalcites to contain a third or up to a fourth highly dispersed cation, forming part of the layers of the initial hydrotalcite, to modulate the basic strength of the sites where SOx acid molecules interact and/or which they capture. In this invention, it is demonstrated that the reduction speed (that is, the removal of sulfates from the absorbent material) increases considerably in calcined ternary or quaternary hydrotalcites. The reduction speed is crucial for the commercial utilization of these materials as $SO_x$ reducing additives in the FCC process, since contact times are usually between close to 2 to 5 seconds with reducing gases. The latter are the hydrocarbons and/or hydrogen involved in the FCC process.

The following examples will illustrate a few of the aspects described in this invention. These examples, however, should not be used to limit the sphere of this invention, since there are many variations that can be derived without distancing ourselves from the topic of this invention.

Co-precipitation methods, at low and high supersaturation for obtaining the HT's compounds, were employed. The selection of one method or the other will be determined, in some cases, by the nature of the cations to be precipitated. The pH optimizations and the ageing time of the solids permit to obtain well crystallized solids.

a) Co-precipitation at low supersaturation.

In co-precipitation at low supersaturation, at a constant pH, the most commonly used conditions are the following: pH rank from 7 to 10, temperature from 333 to 353 K, low concentration of reagents and a slow addition speed for the cation solution and the alkaline solution. The precipitate obtained is given an aging time under the conditions of co-precipitation, and this induces the dissolution of the small crystals and the growth of the large ones. Afterwards the solid is washed with hot water and finally dried at a temperature generally not exceeding 393K.

b) Co-precipitation at high supersaturation.

The main difference between this method and the foregoing one is that in this one the metal solution is added to the alkaline solution within a relatively short time (only the final precipitation pH is controlled). This method generally gives rise to less crystalline materials than those obtained by the low supersaturation method, due to the fact that in this case the nucleation speed is comparable to the speed of growth of the crystals.

EXAMPLES

Preparation of the MgFeAl Series

Hydrotalcite type solids with the developed formula $[Mg_{1-y-z}Fe_yAl_z(OH)_2]^{x+}(A^{n-}_{y+z/n})^{x-} \cdot mH_2O$, were prepared by co-precipitation at high supersaturation.

Example 1

Obtaining the hydrotalcite with the developed formula $[Mg_{0.714}Fe_{0.107}Al_{0.179}(OH)_2](CO_3)_{0.143} \cdot 0.828\ H_2O$, was carried out in the following manner: First an aqueous solution (A) was prepared with 49.06 g of Mg(NO$_3$)$_2$.6H$_2$O, 13.28 g of Al(NO$_3$)$_3$.9H$_2$O and 11.49 g Fe(NO$_3$)$_3$.9H$_2$O in 250 cm$^3$ water. Meanwhile, an alkaline solution was prepared (B), containing 23.27 g of K$_2$CO$_3$ and 22.00 g of KOH in 250 cm$^3$ of water. The (A) solution was added to a glass reactor, the (B) solution began to drip slowly until it reached a final pH of 9. The solution obtained was kept under mechanical stirring at a temperature of 353K during 18 hours. Afterwards, the precipitate obtained was washed and filtered with hot de-ionized water (333-353K) during enough time to eliminate excess ions. Drying was performed at a temperature of 373 K during 24 h.

Example 2

Synthesis of [Mg$_{0.704}$Fe$_{0.192}$Al$_{0.104}$(OH)$_2$](CO$_3$)$_{0.148}$·0.920 H$_2$O. An aqueous solution (A) was prepared with 49.06 g of Mg(NO$_3$)$_2$.6H$_2$O, 7.50 g of Al(NO$_3$)$_3$.9H$_2$O and 17.77 g of Fe(NO$_3$)$_3$.9H$_2$O in 250 cm$^3$ of water. On the other hand, an alkaline solution (B) was prepared, containing 23.27 g of K$_2$CO$_3$ and 22.00 g of KOH in 250 cm$^3$ of water. Solution (A) was added to a glass reagent, solution (B) began to drip slowly until it reached a final pH of 9. The solution maintained was kept under vigorous mechanical stirring, at a temperature of 353 K for 18 hours. Afterwards, the precipitate obtained was washed and filtered with hot de-ionized water (353 K) during enough time to eliminate excess ions. Drying took place at a temperature of 373K during 24 h.

Example 3

Synthesis of [Mg$_{0.651}$Fe$_{0.063}$Al$_{0.286}$(OH)$_2$](CO$_3$)$_{0.174}$·0.821 H$_2$O. An aqueous solution (A) was prepared with 98.12 g of Mg(NO$_3$)$_2$.6H$_2$O, 37.47 g of Al(NO$_3$)$_3$.9H$_2$O and 11.20 g of Fe(NO$_3$)$_3$.9H$_2$O in 500 cm$^3$ of water. Meanwhile, an alkaline solution (B) was prepared, containing 46.48 g of K$_2$CO$_3$ and 44.03 g of KOH in 500 cm$^3$ of water. Solution (A) was added to a glass reagent; solution (B) began to drip slowly until it reached a final pH of 9. The solution obtained was kept under vigorous mechanical stirring, at a temperature of 353 K for 18 hours. Afterwards, the precipitate obtained was washed and filtered with hot de-ionized water (353 K) during enough time in order to eliminate excess ions. Drying took place at a temperature of 373K during 24 h.

Table 4 shows the texture properties of the synthesized compounds. FIG. 1 exhibits the diffraction patterns of these solids, which correspond to a hydrotalcite type structure.

TABLE 4

Developed formula and textural properties of HT's.

| Sample* | BET Area (m$^2$/g) | Dp (nm) | Vp (cm$^3$/g) |
|---|---|---|---|
| [Mg$_{0.651}$Fe$_{0.063}$Al$_{0.286}$(OH)$_2$](CO$_3$)$_{0.174}$·0.82H$_2$O | 206 | 12.36 | 0.782 |
| [Mg$_{0.714}$Fe$_{0.107}$Al$_{0.179}$(OH)$_2$](CO$_3$)$_{0.143}$·0.83H$_2$O | 169 | 9.13 | 0.558 |
| [Mg$_{0.704}$Fe$_{0.192}$Al$_{0.104}$(OH)$_2$](CO$_3$)$_{0.148}$·0.92H$_2$O | 124 | 14.30 | 0.603 |

*Textural properties of calcined samples at 923K in air atmosphere for 4 h.
Dp: Average pore diameter.
Vp: Total pore volume.

Preparation of the MgZnAl Series.

These solids, having a general developed formula: [Mg$_{1-x-y}$Zn$_x$Al$_y$(OH)$_2$]$^{x+}$(A$^{n-}_{y/n}$)$^{x-}$mH$_2$O, were prepared by the co-precipitation method at low supersaturation.

Example 4

Synthesis of [Mg$_{0.614}$Zn$_{0.093}$Al$_{0.293}$(OH)$_2$](CO$_3$)$_{0.146}$·0.731 H$_2$O. An aqueous solution (A, 1M) was prepared, containing the dissolved salts of Mg(NO$_3$)$_2$.6H$_2$O (19.51 g), Zn(NO$_3$)$_2$.6H$_2$O (3.27 g) and Al(NO$_3$)$_3$.9H$_2$O (10.88 g) in 116 cm$^3$. Meanwhile, an alkaline solution (B, 2M) was prepared, containing K$_2$CO$_3$ (18.15 g) and KOH (17.22 g) in 200 cm$^3$ of H$_2$O. Solutions (A) and (B) were added simultaneously to a glass reactor, containing previously 100 cm$^3$ of de-ionized H$_2$O, at a controlled pH of 9. The precipitate obtained was kept under vigorous mechanical stirring, at a temperature of 353 K for 18 hours. Afterwards, the final product was washed and filtered with hot de-ionized water (353 K), enough in order to eliminate excess ions. Drying was carried out at a temperature of 373K for 24 h.

Example 5

Synthesis of [Mg$_{0.493}$Zn$_{0.165}$Al$_{0.342}$(OH)$_2$](CO$_3$)$_{0.171}$·0.978 H$_2$O. An aqueous solution (A, 1M) was prepared, containing the dissolved salts of Mg(NO$_3$)$_2$.6H$_2$O (16.94 g), Zn(NO$_3$)$_2$.6H$_2$O (5.35 g) and Al(NO$_3$)$_3$.9H$_2$O (10.50 g) in 112 cm$^3$. Meanwhile, an alkaline solution (B, 2M) was prepared, containing K$_2$CO$_3$ (18.15 g) and KOH (17.22 g) in 200 cm$^3$ of H$_2$O. Solutions (A) and (B) were added simultaneously to a glass reactor, containing previously 100 cm$^3$ of de-ionized H$_2$O, at a controlled pH of 9. The precipitate obtained was kept under vigorous mechanical stirring, at a temperature of 353 K for 18 hours. Afterwards, the final product was washed and filtered with hot de-ionized water (353 K) 8 times in order to eliminate excess ions. Drying took place at a temperature of 373K for 24 h.

Example 6

Synthesis of [Mg$_{0.478}$Zn$_{0.232}$Al$_{0.290}$(OH)$_2$](CO$_3$)$_{0.145}$·0.857 H$_2$O. An aqueous solution (A, 1M) was prepared, containing the dissolved salts of Mg(NO$_3$)$_2$.6H$_2$O (14.12 g), Zn(NO$_3$)$_2$.6H$_2$O (7.73 g) and Al(NO$_3$)$_3$.9H$_2$O (10.13 g) in 108 cm$^3$. Meanwhile, an alkaline solution (B, 2M) was prepared, containing K$_2$CO$_3$ (18.15 g) and KOH (17.22 g) in 200 cm$^3$ of H$_2$O. Solutions (A) and (B) were added simultaneously to a glass reactor, containing previously 100 cm$^3$ of de-ionized H$_2$O, at a controlled pH of 9. The precipitate obtained was kept under vigorous mechanical stirring, at a temperature of 353 K for 18 hours. Afterwards, the final product was washed and filtered with hot de-ionized water (353 K) 8 times in order to eliminate excess ions. Drying was performed at a temperature of 373K for 24 h.

Example 7

Preparation of [Mg$_{0.487}$Zn$_{0.201}$Al$_{0.312}$(OH)$_2$](CO$_3$)$_{0.156}$·0.902 H$_2$O. An aqueous solution (A, 1M) was prepared, containing the dissolved salts of Mg(NO3)$_2$.6H$_2$O (15.14 g), Zn(NO$_3$)$_2$.6H$_2$O (6.84 g) and Al(NO$_3$)$_3$.9H$_2$O (10.13 g) in 109 cm$^3$. On the other hand, an alkaline solution (B, 2M) was prepared, containing K$_2$CO$_3$ (18.15 g) and KOH (17.22 g) in 200 cm$^3$ of H$_2$O. Solutions (A) and (B) were added simultaneously to a glass reactor, containing previously 100 cm$^3$ of de-ionized H$_2$O, at a controlled pH of 9. The precipitate obtained was kept under vigorous mechanical stirring, at a temperature of 353K for 18 hours. Afterwards, the final product was washed and filtered with hot de-ionized water (353 K) 8 times in order to eliminate excess ions. Drying took place at a temperature of 373K for 24 h. Table 5 shows the results of the texture analyses of the solids obtained. FIG. 2 shows the diffraction patterns of these solids, and they correspond to a hydrotalcite type structure.

TABLE 5

Developed formula and textural properties of HT's.

| Sample* | BET Area ($m^2/g$) | Dp (nm) | Vp ($cm^3/g$) |
|---|---|---|---|
| $[Mg_{0.614}Zn_{0.093}Al_{0.293}(OH)_2](CO_3)_{0.146} \cdot 0.73H_2O$ | 175 | 14.2 | 0.480 |
| $[Mg_{0.493}Zn_{0.165}Al_{0.342}(OH)_2](CO_3)_{0.171} \cdot 0.98H_2O$ | 193 | 16.22 | 0.870 |
| $[Mg_{0.487}Zn_{0.201}Al_{0.312}(OH)_2](CO_3)_{0.156} \cdot 0.90H_2O$ | 175 | 16.53 | 0.842 |
| $[Mg_{0.478}Zn_{0.232}Al_{0.290}(OH)_2](CO_3)_{0.145} \cdot 0.86H_2O$ | 139 | 24.35 | 0.925 |

*Textural properties of calcined samples at 923K in air atmosphere for 4 h.
Dp: Average pore diameter.
Vp: Total pore volume.

Preparation of the MgNiAl Series.

These solids, with the general developed formula: $[Mg_{1-x-y}Ni_xAl_y(OH)_2]^{x+}(A^{n-}_{y/n})^{x-} \cdot mH_2O$, were prepared by the co-precipitation method at low supersaturation.

Example 8

Synthesis of $[Mg_{0.589}Ni_{0.111}Al_{0.300}(OH)_2](CO_3)_{0.150} \cdot 0.885 H_2O$. An aqueous solution (A, 1M) was prepared, containing the dissolved salts of $Mg(NO_3)_2 \cdot 6H_2O$ (45.69 g), $Ni(NO_3)_2 \cdot 6H_2O$ (3.79 g) and $Al(NO_3)_3 \cdot 9H_2O$ (23.92 g) in 250 $cm^3$. Meanwhile, an alkaline solution (B, 2M) was prepared, containing $K_2CO_3$ (23.26 g) and KOH (20.67 g) in 250 $cm^3$ of $H_2O$. The two solutions (A and B) were mixed by dripping in a glass reactor containing 200 $cm^3$ of de-ionized water; the addition was performed by maintaining a constant pH of 9. The addition time was ±30 minutes. The precipitate obtained was kept at a temperature of 343 K during 18 h under vigorous stirring; afterwards it was washed/filtered 8 times with hot de-ionized water (333 K). Drying the paste obtained was performed at 373 K during 24 h.

Example 9

Synthesis of $[Mg_{0.483}Ni_{0.222}Al_{0.295}(OH)_2](CO_3)_{0.147} \cdot 0.876H_2O$. An aqueous solution (A, 1M) was prepared, containing the dissolved salts of $Mg(NO_3)_2 \cdot 6H_2O$ (42.07 g), $Ni(NO_3)_2 \cdot 6H_2O$ (7.84 g) and $Al(NO_3)_3 \cdot 9H_2O$ (23.92 g) in 250 $cm^3$. On the other hand, an alkaline solution (B, 2M) was prepared, containing $K_2CO_3$ (23.26 g) and KOH (20.67 g) in 250 $cm^3$ of $H_2O$. The two solutions (A and B) were mixed by dripping in a glass reactor containing 200 $cm^3$ of de-ionized water; the addition was carried out by maintaining a constant pH of 9. The addition time was ±30 minutes. The precipitate obtained was kept at a temperature of 343 K for 18 h under vigorous stirring; afterwards it was washed/filtered 8 times with hot de-ionized water (333 K). Drying the paste obtained was carried out at 373 K for 24 h.

Example 10

Synthesis of $[Mg_{0.457}Ni_{0.292}Al_{0.251}(OH)_2](CO_3)_{0.126} \cdot 0.849 H_2O$. An aqueous solution (A, 1M) was prepared, containing the dissolved salts of $Mg(NO_3)_2 \cdot 6H_2O$ (38.25 g), $Ni(NO_3)_2 \cdot 6H_2O$ (12.13 g) and $Al(NO_3)_3 \cdot 9H_2O$ (23.92 g) in 250 $cm^3$. Meanwhile, an alkaline solution (B, 2M) was prepared, containing $K_2CO_3$ (23.26 g) and KOH (20.67 g) in 250 $cm^3$ of $H_2O$. The two solutions (A and B) were mixed by dripping in a glass reactor containing 200 $cm^3$ of de-ionized water; the addition was performed by maintaining a constant pH of 9. The addition time was approximately 30 minutes. The precipitate obtained was kept at a temperature of 343 K during 18 h under vigorous stirring; afterwards it was washed/filtered 8 times with hot de-ionized water (333 K). Drying the final product was performed at 373 K for 24 h.

TABLE 6

Developed formula and textural properties of HT's.

| Sample* | BET Area ($m^2/g$) | Dp (nm) | Vp ($cm^3/g$) |
|---|---|---|---|
| $[Mg_{0.589}Ni_{0.111}Al_{0.300}(OH)_2](CO_3)_{0.150} \cdot 0.89H_2O$ | 240 | 6.96 | 0.534 |
| $[Mg_{0.483}Ni_{0.222}Al_{0.295}(OH)_2](CO_3)_{0.147} \cdot 0.88H_2O$ | 251 | 7.23 | 0.604 |
| $[Mg_{0.457}Ni_{0.292}Al_{0.251}(OH)_2](CO_3)_{0.126} \cdot 0.85H_2O$ | 231 | 4.75 | 0.373 |

*Textural properties of calcined samples at 923K in air atmosphere for 4 h.
Dp: Average pore diameter.
Vp: Total pore volume.

Table 6 shows the results of the texture analyses of the calcined hydrotalcites. In FIG. 3 we appreciate the diffraction patterns of X-rays corresponding to a hydrotalcite type structure.

Preparation of the M(II) CuAl Series, where M(II): $Mg^{2+}$, $Co^{2+}$ (Ternary)

These compounds, with the general developed formula: $[M(II)_{1-x-y}Cu_xAl_y(OH)_2]^{x+}(A^{n-}_{y/n})^{x-} \cdot mH_2O$, were prepared by the co-precipitation method at low supersaturation. It is worth mentioning that to synthesize this type of solids, a very strict control should be exercised over the parameters, given that the cations presenting the well-known Jahn-Teller effect, in this case particularly $Cu^{2+}$, tend not to become incorporated or to exit the hydrotalcite structure easily.

Example 11

Synthesis of $[Mg_{0.307}Cu_{0.118}Al_{0.578}(OH)_2](CO_3)_{0.289} \cdot 0.803 H_2O$. A 2 Molar solution was prepared, containing the metallic nitrates $Mg(NO_3)_2 \cdot 6H_2O$ (36.73 g), $Al(NO_3)_3 \cdot 9H_2O$ (19.14 g), $Cu(NO_3)_2 \cdot 6H_2O$ (2.28 g), within a volume of 100 $cm^3$, solution A. A second 2 Molar solution was prepared, containing $K_2CO_3$ (111.68 g) dissolved in 400 $cm^3$ of de-ionized water, solution B. The two solutions were mixed by dripping in a glass reactor, containing previously 100 $cm^3$ of de-ionized water at 333K. The addition was carried out by maintaining a constant pH of 10. The addition time was of approximately 25 minutes. The precipitate obtained was kept at a temperature of (333K) for 20 minutes under vigorous mechanical stirring; afterwards the greenish product was washed/filtered 5 times with hot de-ionized water (333K). Drying of the HT obtained was carried out at 373K during 24 h.

Example 12

Synthesis of $[Mg_{0.658}Cu_{0.098}Al_{0.244}(OH)_2](CO_3)_{0.122} \cdot 0.687 H_2O$. A 2 Molar solution was prepared, containing the metallic nitrates Mg $(NO_3)_2 \cdot 6H_2O$ (51.10 g), $Al(NO_3)_3 \cdot 9H_2O$ (28.71 g), $Cu(NO_3)_2 \cdot 6H_2O$ (7.05 g), within a volume of 150 $cm^3$, solution A. A second 2 Molar solution was prepared, containing $K_2CO_3$ (181.49 g) dissolved in 650 $cm^3$ of de-ionized water, solution B. The two solutions were mixed by dripping in a glass reactor, containing previously 100 $cm^3$ of de-ionized water at 333K. The addition was performed by maintaining a constant pH of 10. The addition time was approximately 26 minutes. The precipitate obtained was kept at a temperature of (333K) during 20 minutes under vigorous mechanical stirring; afterwards the greenish product was washed/filtered 5 times with hot de-ionized water (333K). Drying of the HT obtained was carried out at 373K during 24 h.

Example 13

Synthesis of $[Mg_{0.600}Cu_{0.148}Al_{0.252}(OH)_2](CO_3)_{0.126} \cdot 0.709H_2O$. A 2 Molar solution was prepared, containing the metallic nitrates $Mg(NO_3)_2 \cdot 6H_2O$ (31.13 g), $Al(NO_3)_3 \cdot 9H_2O$ (19.14 g), $Cu(NO_3)_2 \cdot 6H_2O$ (7.35 g), within a volume of 100 cm³, solution A. A second 2 Molar solution was prepared, containing $K_2CO_3$ (139.61 g) dissolved in 450 cm³ of de-ionized water, solution B. The two solutions (A and B) were mixed by dripping in a glass reactor containing previously 100 cm³ of de-ionized water at 333K. The addition was performed by keeping a constant pH of 10. The addition time was approximately 21 minutes. The precipitate obtained was kept at a temperature of (333K) for 20 minutes under vigorous mechanical stirring; afterwards the greenish product was washed/filtered 5 times with hot de-ionized water (333K). Drying of the HT obtained was carried out at 373K for 18 h.

Example 14

Synthesis of $[CO_{0.620}Cu_{0.206}Al_{0.173}(OH)_2](CO_3)_{0.108} \cdot 0.910 \; H_2O$. A 1M solution was prepared, containing the metallic nitrates $Co(NO_3)_2 \cdot 6H_2O$ (87 g), $Al(NO_3)_3 \cdot 9H_2O$ (37 g), $Cu(NO_3)_2 \cdot 6H_2O$ (23 g), within a volume of 500 cm³, solution A. A second 2M solution was prepared, containing $K_2CO_3$ (117.97 g) and KOH (9.89 g) dissolved in 500 cm³ of de-ionized water, solution B. The two solutions (A and B) were mixed by dripping in a glass reactor containing previously 300 cm³ of de-ionized water at 353K. The addition was carried out by keeping a constant pH of 8. The precipitate obtained was kept at a temperature of 353K during 18 hours, under vigorous mechanical stirring; afterwards, the product was washed/filtered 10 times with de-ionized water. Drying of the HT obtained was performed at 373K for 18 h.

Table 7 shows the results of the texture analysis of the calcinated hydrotalcites. FIG. 4 presents the diffraction patterns of X-rays corresponding to a hydrotalcite type structure.

TABLE 7

Developed formula and textural properties of HT's.

| Sample* | BET Area (m²/g) | Dp (nm) | Vp (cm³/g) |
|---|---|---|---|
| $[Mg_{0.307}Cu_{0.118}Al_{0.578}(OH)_2](CO_3)_{0.289} \cdot 0.80H_2O$ | 200 | 4.74 | 0.346 |
| $[Mg_{0.658}Cu_{0.098}Al_{0.244}(OH)_2](CO_3)_{0.122} \cdot 0.69H_2O$ | 184 | 5.17 | 0.338 |
| $[Mg_{0.600}Cu_{0.148}Al_{0.252}(OH)_2](CO_3)_{0.126} \cdot 0.71H_2O$ | 136 | 6.06 | 0.334 |

*Textural properties of calcined samples at 923K in air atmosphere for 4 h.
Dp: Average pore diameter.
Vp: Total pore volume.

Example 15

Synthesis of $[Mg_{0.655}Al_{0.115}Mn_{0.230}(OH)_2](CO_3)_{0.146} \cdot 0.729 \; H_2O$. The preparation of this type of compounds required the employment of this special manner of synthesis, since due to the great size of the ionic radius of the metallic cation Mn (II) with respect to the other metallic cations employed, which renders its incorporation into the structural network difficult, the procedure was the following: An aqueous solution (A) 2M was prepared with 38.85 g of $Mg(NO_3)_2 \cdot 6H_2O$, 9.57 g of $Al(NO_3)_3 \cdot 9H_2O$ and 14.64 g $MnCl_2 \cdot 4H_2O$ in 500 cm³ of de-ionized water. On the other hand, an alkaline solution (B) 2M was prepared, containing 52.30 g of $K_2CO_3$ and 37.75 g of KOH in 500 cm³ of water. Solution B was placed previously in a glass reactor; solution A began to drip slowly until it reached a final pH of 9.5. The solution obtained was kept under vigorous mechanical stirring, at room temperature, during 3 hours. Afterwards, the precipitate obtained was washed and filtered with de-ionized water 10 times in order to eliminate excess ions. Drying took place at a temperature of 353K during 12 h. The BET specific area determined in this sample, calcined at 923K in air atmosphere for 4 hours, was of 200 m²/g, with a pore volume of 0.587 cm³/g and an average pore diameter comprised between 5-12 nm.

Preparation of the MgZnAlFe (Quaternary) Series

Solids of the hydrotalcite type $[Mg_{1-x-y-z}Zn_xAl_yFe_z(OH)_2]^{X+}(A^{n-}_{y+z/n})^{X-} \cdot mH_2O$, were prepared by co-precipitation at high supersaturation.

Example 16

Obtaining the HT type solid with the developed formula: $[Mg_{0.68}Zn_{0.07}Al_{0.17}Fe_{.008}(OH)_2](CO_3)_{0.125} \cdot 0.90 \; H_2O$, was performed as follows: First, an aqueous solution (A) was prepared with 10.03 g of $Mg (NO_3)_2 \cdot 6H_2O$, 1.19 g of Zn $(NO_3)_2 \cdot 6H_2O$, 3.75 g of $Al(NO_3)_3 \cdot 9H_2O$ and 1.65 g Fe $(NO_3)_3 \cdot 9H_2O$ in 57 cm³ of water. On the other hand, an alkaline solution (B) was prepared, containing 28.12 g of $K_2CO_3$ and 25.80 g of KOH in 305 cm³ of water. Solution A was added previously to a glass reactor; solution B began to drip slowly until it reached a final pH of 9. The solution obtained was kept under vigorous mechanical stirring at a temperature of 353 K for 18 hours. Afterwards, the precipitate obtained was washed and filtered with hot de-ionized water (353 K) 8 times in order to eliminate excess ions. Drying took place at a temperature of 373K during 24 h.

Example 17

Obtaining the HT type solid with the developed formula: $[Mg_{0.71}Zn_{0.04}Al_{0.14}Fe_{0.11}(OH)_2](CO_3)_{0.125} \cdot 0.87 \; H_2O$, was carried out as follows: First, an alkaline solution (A) was prepared with 10.51 g of $Mg(NO_3)_2 \cdot 6H_2O$, 0.56 g of Zn $(NO_3)_2 \cdot 6H_2O$, 3.00 g of $Al(NO_3)_3 \cdot 9H_2O$ y 2.43 g $Fe(NO_3)_3 \cdot 9H_2O$ in 57 cm³ of water. On the other hand, an aqueous solution (B) was prepared, containing 28.12 g of $K_2CO_3$ and 25.80 g of KOH in 305 cm³ of water. Solution A was added previously to a glass reactor; solution B began to drip slowly until it reached a final pH of 9. The solution obtained was kept under vigorous mechanical stirring at a temperature of 353 K during 18 hours. Afterwards, the precipitate obtained was washed and filtered with hot de-ionized water (353 K) 8 times in order to eliminate excess ions. Drying took place at a temperature of 373K during 24 h.

Binary Hydrotalcites

The following examples refer to binary hydrotalcites used only with purposes comparative to multimetallic hydrotalcites. The characterization results of this group are integrated on the respective Tables and Figures of multimetallic hydrotalcites.

Example 18

Synthesis of $[Mg_{0.643}Fe_{0.357}(OH)_2](CO_3)_{0.143} \cdot 0.807H_2O$. An aqueous (A) 1 molar solution was prepared, containing the dissolved salts of $Mg(NO_3)_2 \cdot 6H_2O$ (21.62 g) and Fe(NO$_3$)$_3$.9H$_2$O (11.55 g) in 112 cm$^3$ of de-ionized water. On the other hand, an alkaline solution (B) 2M was prepared, containing K$_2$CO$_3$ (9.3 g) and KOH (8.51 g) with a molar relationship of KOH/K$_2$CO$_3$=2, in 100 cm$^3$ of de-ionized water. Solution A was placed previously in a glass reactor; then solution B began to drip slowly until it reached a final pH of 9 in the reactor. The solution obtained was kept under mechanical stirring at a temperature of 353K for 18 hours. Afterwards, the precipitate obtained was washed and filtered with hot de-ionized water (353 K) 8 times in order to eliminate excess ions. Drying took place at a temperature of 373K during 24 h.

Example 19

Synthesis of [Mg$_{0.744}$Al$_{0.256}$(OH)$_2$](CO$_3$)$_{0.128}$.0.850 H$_2$O. An aqueous solution (A, 1M) was prepared, containing the dissolved salts of Mg(NO$_3$)$_2$.6H$_2$O (23.1 g) and Al(NO$_3$)$_3$.9H$_2$O (11.25 g) in 120 cm$^3$ of de-ionized water. On the other hand, an alkaline solution (B) 2M was prepared, with a moral relationship of KOH/K$_2$CO$_3$=2, and for this 11.17 g of K$_2$CO$_3$ and 10.20 g of KOH were dissolved in 120 cm$^3$ of de-ionized water. Solutions A and B were added simultaneously to a glass reactor containing previously 100 cm$^3$ of de-ionized water. The precipitation was performed at a constant pH of 10. The solution obtained was kept under vigorous mechanical stirring, at a temperature of 353 K, during 18 hours. Afterwards, the precipitate obtained was washed and filtered with hot de-ionized water (353 K) 8 times in order to eliminate excess ions. Drying took place at a temperature of 373K for 24 h.

Example 20

Preparation of the compound [Zn$_{0.750}$Al$_{0.250}$(OH)$_2$](CO$_3$)$_{0.125}$.0.840 H$_2$O. An aqueous solution (A, 1M) was prepared, containing the dissolved salts of Zn(NO$_3$)$_2$.6H$_2$O (19.63 g) y Al(NO$_3$)$_3$.9H$_2$O (8.25 g) in 88 cm$^3$ of de-ionized water. On the other hand, an alkaline solution (B) 2M was prepared, with a molar relationship of KOH/K$_2$CO$_3$=2, and for this 9.30 g of K$_2$CO$_3$ and 8.51 g of KOH were dissolved in 100 cm$^3$ of de-ionized water. Solutions A and B were added simultaneously to a glass reactor containing previously 100 cm$^3$ of de-ionized water. The precipitation was performed at a constant pH of 9. The solution obtained was kept under vigorous mechanical stirring, at a temperature of 353 K, for 18 hours. Afterwards, the precipitate obtained was washed and filtered with hot de-ionized water (353 K) 8 times in order to eliminate excess ions. Drying took place at a temperature of 373K for 24 h.

Example 21

Synthesis of [Ni$_{0.833}$Al$_{0.167}$(OH)$_2$](CO$_3$)$_{0.084}$.0.683H$_2$O. An aqueous solution (A, 1M) was prepared, containing the dissolved salts of Ni(NO$_3$)$_2$.6H$_2$O (20.56 g) and Al(NO$_3$)$_3$.9H$_2$O (7.50 g) in 90 cm$^3$ of de-ionized water. On the other hand, an alkaline solution (B) 2M was prepared, with a molar relationship of KOH/K$_2$CO$_3$=2, and for this 9.3 g of K$_2$CO$_3$ and 8.51 g of KOH were dissolved in 100 cm$^3$ of de-ionized water. Solutions A and B were added simultaneously to a glass reactor containing previously 100 cm3 of de-ionized water. The precipitation was performed at a constant pH of 9. The solution obtained was kept under vigorous mechanical stirring, at a temperature of 353 K, during 18 hours. Afterwards, the precipitate obtained was washed and filtered with hot de-ionized water (353 K) 8 times in order to eliminate excess ions. Drying took place at a temperature of 373K for 24 h.

Example 22

Synthesis of [Mg$_{0.670}$Fe$_{0.330}$(OH)$_2$](CO$_3$)$_{0.165}$.0.80 H$_2$O. An aqueous solution (A) 1 molar was prepared, containing the dissolved salts of MgCl$_2$.6H$_2$O (17.43 g) and FeCl$_3$.9H$_2$O (7.72 g) in 112 cm$^3$ of de-ionized water. On the other hand, an alkaline solution (B) 2M was prepared, containing K$_2$CO$_3$ (9.3 g) and KOH (8.51 g) with a molar relationship of KOH/K$_2$CO$_3$=2, in 100 cm$^3$ of de-ionized water. Solution A was placed previously in a glass reactor; later solution B began to drip slowly until it reaches a final pH of 9 in the reactor. The solution obtained was kept under mechanical stirring at a temperature of 353K during 18 hours. Afterwards, the precipitate obtained was washed and filtered with hot de-ionized water (353 K) 8 times in order to eliminate excess ions. Drying took place at a temperature of 373K for 24 h.

Example 23

Synthesis of [Mg$_{0.730}$Al$_{0.270}$(OH)$_2$](CO$_3$)$_{0.135}$. 0.71 H$_2$O. An aqueous solution (A, 1M) was prepared, containing the dissolved salts of MgCl$_2$.6H$_2$O (18.67 g) and AlCl$_3$.9H$_2$O (7.32 g) in 120 cm$^3$ of de-ionized water. On the other hand, an alkaline solution (B) 2M was prepared, with a molar relationship of KOH/K$_2$CO$_3$=2, and for this 11.17 g of K$_2$CO$_3$ and 10.20 g of KOH were dissolved in 120 cm$^3$ of de-ionized water. Solutions A and B were added simultaneously to a glass reactor containing previously 100 cm$^3$ of de-ionized water. The precipitation was carried out at a constant pH of 10. The solution obtained was kept under vigorous mechanical stirring, at a temperature of 353 K for 18 hours. Afterwards, the precipitate obtained was washed and filtered with hot de-ionized water (353 K) 8 times in order to eliminate excess ions. Drying took place at a temperature of 373K during 24 h.

Example 24

Preparation of compound [Zn$_{0.750}$Al$_{0.250}$(OH)$_2$](CO$_3$)$_{0.125}$.0.84 H$_2$O. An aqueous solution (A, 1M) was prepared, containing the dissolved salts of ZnCl$_2$.6H$_2$O (9.18 g) and AlCl$_3$.9H$_2$O (5.36 g) in 88 cm$^3$ of de-ionized water. On the other hand, an alkaline solution (B) 2M was prepared, with a molar relationship of KOH/K$_2$CO$_3$=2, and for this 9.30 g of K$_2$CO$_3$ and 8.51 g of KOH were dissolved in 100 cm$^3$ of de-ionized water. Solutions A and B were added simultaneously to a glass reactor containing previously 100 cm$^3$ of de-ionized water. The precipitation was carried out at a constant pH of 9. The solution obtained was kept under vigorous mechanical stirring, at a temperature of 353 K for 18 hours. Afterwards, the precipitate obtained was washed and filtered with hot de-ionized water (353 K) 8 times in order to eliminate excess ions. Drying took place at a temperature of 373K during 24 h.

Table 8 shows the results of the texture analyses of the calcined hydrotalcites. FIGS. 1 to 4 show the diffraction patterns of the X-rays of such compounds, where we may appreciate a hydrotalcite type structure.

TABLE 8

Developed formula and textural properties of HT's.

| Sample* | Area BET ($m^2/g$) | Dp (nm) | Vp ($cm^3/g$) |
|---|---|---|---|
| $[Mg_{0.643}Fe_{0.357}(OH)_2](CO_3)_{0.143}\cdot 0.81H_2O$ | 177 | 2-12 | 0.391 |
| $[Mg_{0.744}Al_{0.256}(OH)_2](CO_3)_{0.128}\cdot 0.85H_2O$ | 276 | 7-16 | 0.674 |
| $[Zn_{0.75}Al_{0.25}(OH)_2](CO_3)_{0.125}\cdot 0.84H_2O$ | 48 | 2-7 | 0.085 |
| $[Ni_{0.833}Al_{0.167}(OH)_2](CO_3)_{0.084}\cdot 0.68H_2O$ | 260 | 2-5 | 0.511 |
| $[Mg_{0.670}Fe_{0.330}(OH)_2](CO_3)_{0.165}\cdot 0.80H_2O$ | 159 | 5-10 | 0.362 |
| $[Mg_{0.730}Al_{0.270}(OH)_2](CO_3)_{0.135}\cdot 0.71H_2O$ | 234 | 12 | 0.564 |
| $[Zn_{0.750}Al_{0.250}(OH)_2](CO_3)_{0.125}\cdot 0.84H_2O$ | 51 | 2-12 | 0.112 |

*Textural properties of calcined samples at 923K in air atmosphere for 4 h.
Dp: Average pore diameter.
Vp: Total pore volume.

Anion Exchange:

Given that in certain of the aforementioned preparations, all or some of the precursor salts, where there were metallic chlorides ($[Mn_{0.670}Fe_{0.330}(OH)_2](CO_3)_{0.165}\cdot 0.80$ $H_2O$, $[Mg_{0.730}Al_{0.270}(OH)_2](CO_3)_{0.135}$ 0.71 $H_2O$, $[Zn_{0.750}Al_{0.250}(OH)_2](CO_3)_{0.125}\cdot 0.84$ $H_2O$, $[Mg_{0.655}Al_{0.115}Mn_{0.230}(OH)_2](CO_3)_{0.146}\cdot 0.729$ $H_2O$), an anionic exchange was effected after the synthesis in such compounds, to have carbonate anions in the interlaminar region, more easily removable than chlorides, since these latter anions remain in hydrotalcites up to 1073 K, thus inhibiting the basic sites. The exchange protocol was the following: An 0.2 M solution of $K_2CO_3$, was placed in contact with the sample to be exchanged, during 3 hours, under vigorous stirring, at a temperature of 343K. Afterwards, it was washed and filtered 8 times with de-ionized water. Drying of the product obtained was performed at 373K for 24 h. In order to obtain a high degree of carbonate anion exchange, the above operation is repeated once more.

Although the invention has been described with a certain degree of particularity, it is understood that the present disclosure has been made only by way of example. Thus, the scope of the invention should not be limited by the foregoing specification, but rather, only by the scope of the claims appended hereto.

What is claimed is:

1. A process of purifying exhaust gas, comprising the steps of:

contacting an SOx-containing exhaust gas with a mixed multimetallic oxide absorbent for sufficient time to remove SOx from the exhaust gas, wherein the mixed multimetallic oxides are hydrotalcite type compounds having four metallic cations, forming part of sheets of the hydrotalcite type compounds represented by the following formula:

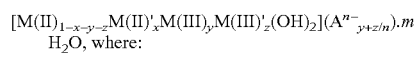
    $H_2O$, where:

[M(II)+M(II)']/[M(III)+M(III)'], is the molar relationship between divalent cations and trivalent cations, and is between 0.5 and 10;
    M(II) represents an element of group 2, 6-12 of the periodic table with a valence equal to two;
    M(II)' represents an element of group 2, 6-12 of the periodic table with a valence equal to two or three, which can be the same as M(II) but with different valence;
    M(III) represents an element of group 4-8, 13 with a valence equal to 3 and different from M(II) and M(II)';
    M(III)' represents an element of group 4-8, 13 with a valence equal to 3 and different from M(II) and M(III) or the same as M(III) but with a different valence;
    A, represents an interlaminar anion located between the sheets;

n−, represents the negative electronic charge of the interlaminar anion, and may be from −1 to −8);
x=0.01 up to 0.99;
y=0.01 up to 0.99; and
z=0.01 up to 0.99.

2. The process of claim 1, wherein M(II) is $Mg^{2+}$, M(II)' is $Zn^{2+}$, M(III) is $Al^{3+}$ and M(III)' is $Fe^{3+}$.

3. The process of claim 1, wherein M(II) is $Mg^{2+}$, M(II)' is $Ni^{2+}$ and M(III) is $Al^{3+}$ and M(III)' is $Fe^{3+}$.

4. The process of claim 1, wherein M(II) is $Mg^{2+}$, M(II)' is $Cu^{2+}$ and M(III) is $Al^{3+}$ and M(III)' is $Fe^{3+}$.

5. The process of claim 1, wherein M(II) is $Mg^{2+}$, M(II)' is $Co^{2+}$ and M(III) is $Al^{3+}$ and M(III)' is $Fe^{3+}$.

6. The process of claim 1, wherein M(II) is $Mg^{2+}$, M(II)' is $Fe^{2+}$ and M(III) is $Al^{3+}$ and M(III)' is $Fe^{3+}$.

7. The process of claim 1, wherein M(II) is $Mg^{2+}$, M(II)' is $Zn^{2+}$, M(III) is $Al^{3+}$, and M(III)' is selected from the group consisting of $Co^{3+}$, $Mn^{3+}$, $Ga^{3+}$ and $Cr^{3+}$.

8. The process of claim 1, wherein M(II) is $Mg^{2+}$, M(II)' is $Fe^{2+}$ and M(III) is selected from the group consisting of $Al^{3+}$, and M(III)' is $Fe^{3+}$, $Co^{3+}$, $Mn^{3+}$ $Ga^{3+}$ and $Cr^{3+}$.

9. The process of claim 1, wherein M(II) is $Mg^{2+}$, M(II)' is $Co^{2+}$, M(III) is $Al^{3+}$, and M(II)' is selected from the group consisting of $Fe^{3+}$, $Co^{3+}$, $Mn^{3+}$, $Ga^{3+}$ and $Cr^{3+}$.

10. The process of claim 1, wherein M(II) is $Mg^{2+}$, M(II)' is $Ni^{2+}$, M(III) is $Al^{3+}$, and M(III)' is selected from the group consisting of $Fe^{3+}$, $Co^{3+}$, $Mn^{3+}$, $Ga^{3+}$ and $Cr^{3+}$.

11. The process of claim 1, wherein M(II) is $Mg^{2+}$, M(II)' is $Zn^{2+}$, M(III) is $Al^{3+}$, and M(III)' is selected from the group consisting of $Fe^{3+}$, $Co^{3+}$, $Mn^{3+}$, $Ga^{3+}$ and $Cr^{3+}$.

12. The process of claim 1, wherein M(II) is $Mg^{2+}$, M(II)' is $Cu^{2+}$, M(III) is $Al^{3+}$, and M(III)' is selected from the group consisting of $Fe^{3+}$, $Co^{3+}$, $Mn^{3+}$, $Ga^{3+}$ and $Cr^{3+}$.

13. The process of claim 1, wherein m has a value >0 and $\leq 2$.

14. The process of claim 1, wherein said compounds are in the form of powder with a particle size between 20 and 120 microns and a density between 0.7 and 1.0 $g/cm^3$.

15. The process of claim 1, wherein at least one of M(III) and M(III)' is $Al^{3+}$.

16. A process of purifying exhaust gas, comprising the steps of:

contacting an SOx-containing exhaust gas with a mixed multimetallic oxide absorbent for sufficient time to remove SOx from the exhaust gas, wherein the mixed multimetallic oxides are hydrotalcite type compounds having four metallic cations, forming part of sheets of the hydrotalcite type compounds represented by the following formula:

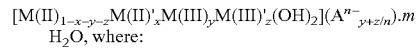
    $H_2O$, where:

[M(II)+M(II)']/[(M(III)+M(III)'], is the molar relationship between divalent cations and trivalent cations, and is between 0.5 and 10;
    M(II) represents an element of group 2, 6-12 of the periodic table with a valence equal to two;
    M(II)' represents an element of group 2, 6-12 of the periodic table with a valence equal to two or three, which can be the same as M(II) but with different valence;
    M(III) represents an element of group 4-8, 13 with a valence equal to 3 and different from M(II) and M(II)';
    M(III)' represents an element of group 4-8, 13 with a valence equal to 3 and different from M(II) and M(III) or the same as M(III) but with a different valence;
    A, represents an interlaminar anion located between the sheets;

n–, represents the negative electronic charge of the interlaminar anion, and may be from –1 to –8);
x=0.01 up to 0.99;
y=0.01 up to 0.99; and
z=0.01 up to 0.99;
and where the multimetallic hydrotalcites are prepared by a process comprising:
(1) preparing an aqueous or organic solution containing three or more cations from precursor compounds selected from the group consisting of oxides, hydroxides, chlorides, nitrates, acetates and mixtures thereof;
(2) preparing an alkaline solution of 0.5 to 10 molarity from at least one selected from the group consisting of KOH, $K_2CO_3$, $(NH_4)_2CO_3$, $NH_4(OH)$, urea, an alkaline compound, except a sodium compound, and mixtures thereof;
(3) slowly combining solutions (1) and (2) to cause co-precipitation of the cations at a pH between 7 and 12 at a temperature between 293 and 373 K to obtain a precipitate containing hydrotalcites;
(4) washing the precipitate containing the hydrotalcites with water to remove non-precipitated ions;
(5) drying the precipitate between 333 and 473K in an atmosphere selected from the group consisting of air, oxygen, nitrogen, under vacuum, or mixtures thereof; and
(6) calcining the dried hydrotalcites between 573 and 1273K in a stream selected from the group consisting of air, oxygen, nitrogen, or mixtures thereof.

17. The process of claim 16, wherein the exhaust gas is obtained from a fluid layer catalytic cracking process.

18. The process of claim 16, wherein the mixed multimetallic oxide has a $CO_2$ ($\Delta H$) adsorption heat, measured at room temperature, of between 50 and 150 KJ/mol with a number of basic sites between 0.2 and 5.0 μmol $CO_2$ adsorbed/$m^2$.

19. The process of claim 16, wherein said multimetallic oxides are in the form of powder with a particle size between 20 and 120 microns and a density between 0.7 and 1.0 g/$cm^3$.

20. The process of claim 16, wherein the mixed multimetallic oxides have a total absorption capacity of sulfur oxides between 2.5 and 30% weight of S/$m^2$ of absorbent material, at 923K.

21. The process of claim 16, wherein the mixed multimetallic oxides have a $SO_2$ or $SO_3$ absorption speed of 0.25 at 4.0 $min^{-1}$ at 923 K.

22. The process of claim 21, further comprising contacting the mixed multimetallic oxides with a gas stream containing hydrocarbons and/or hydrogen at a temperature between 673 and 1273K, to remove the sulfur oxides and regenerate the multimetallic oxides.

23. The process of claim 16, wherein the mixed multimetallic oxides have a reduction speed between 0.2 and 5 $min^{-1}$, at a temperature between 793 and 873 K.

24. A catalyst for removing $SO_x$ from an $SO_x$-containing exhaust gas, said catalyst comprising a mixed multimetallic oxide absorbent, the mixed multimetallic oxides being hydrotalcite type compounds having four metallic cations, forming part of sheets of the hydrotalcite type compounds represented by the following formula:

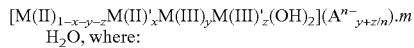

[M(II)+M(II)']/[M(III)+M(III)'], is the molar relationship between divalent cations and trivalent cations, and is between 0.5 and 10;
M(II) represents an element of group 2, 6-12 of the periodic table with a valence equal to two;
M(II)' represents an element of group 2, 6-12 of the periodic table with a valence equal to two or three, which can be the same as M(II) but with different valence;
M(III) represents an element of group 4-8, 13 with a valence equal to 3 and different from M(II) and M(II)';
M(III)' represents an element of group 4-8, 13 with a valence equal to 3 and different from M(II) and M(III) or the same as M(III) but with a different valence;
A, represents an interlaminar anion located between the sheets;
n–, represents the negative electronic charge of the interlaminar anion, and may be from –1 to –8);
x=0.01 up to 0.99;
y=0.01 up to 0.99; and
z=0.01 up to 0.99.

25. The catalyst of claim 24, wherein at least one of M(III) and M(III)' is $Al^{3+}$.

* * * * *